(12) United States Patent
Kawasaki et al.

(10) Patent No.: US 8,915,984 B2
(45) Date of Patent: Dec. 23, 2014

(54) ISOLATOR DEVICE

(75) Inventors: Koji Kawasaki, Nagoya (JP); Minoru Miyamoto, Nagoya (JP); Toshinaga Toda, Nagoya (JP)

(73) Assignee: Airex Co., Ltd, Nagoya-shi, Aichi (JP)

( * ) Notice: Subject to any disclaimer, the term of this patent is extended or adjusted under 35 U.S.C. 154(b) by 142 days.

(21) Appl. No.: 13/699,571

(22) PCT Filed: Jun. 10, 2011

(86) PCT No.: PCT/JP2011/063415
§ 371 (c)(1),
(2), (4) Date: Nov. 21, 2012

(87) PCT Pub. No.: WO2011/158763
PCT Pub. Date: Dec. 22, 2011

(65) Prior Publication Data
US 2013/0061567 A1    Mar. 14, 2013

(30) Foreign Application Priority Data

Jun. 18, 2010  (JP) .................................. 2010-138841
Jun. 23, 2010  (JP) .................................. 2010-142274

(51) Int. Cl.
| | | |
|---|---|---|
| B01D 50/00 | (2006.01) | |
| B01D 46/00 | (2006.01) | |
| B01L 1/04 | (2006.01) | |
| B08B 15/02 | (2006.01) | |
| B25J 21/02 | (2006.01) | |
| F24F 3/16 | (2006.01) | |

(52) U.S. Cl.
CPC . B01D 46/00 (2013.01); B01L 1/04 (2013.01); B08B 15/02 (2013.01); B08B 15/026 (2013.01); B25J 21/02 (2013.01); F24F 3/1607 (2013.01); B08B 15/023 (2013.01); *B08B 2215/003* (2013.01); *Y10S 55/18* (2013.01)

USPC ....... 55/385.2; 55/DIG. 18; 454/56; 454/187; 312/1

(58) Field of Classification Search
USPC ........ 55/385.2, 413, 467, 472, 473, 482, 486, 55/DIG. 18, DIG. 29, DIG. 46; 454/49, 56, 454/59, 184, 187, 188, 189
See application file for complete search history.

(56) References Cited

U.S. PATENT DOCUMENTS 3,364,838 A * 1/1968 Bradley .................... 312/213
3,397,631 A * 8/1968 Simons ..................... 454/190
(Continued)

FOREIGN PATENT DOCUMENTS

| JP | 54-14098 | 2/1979 |
| JP | 170118-1987 | 10/1987 |

(Continued)

OTHER PUBLICATIONS

PCT/JP2011/063415—International Search Report.

*Primary Examiner* — Duane Smith
*Assistant Examiner* — Minh-Chau Pham
(74) *Attorney, Agent, or Firm* — Quarles & Brady LLP; Gavin J. Milczarek-Desai

(57) ABSTRACT

An isolator device having a work chamber, air supply means for supplying air of a unidirectional airflow traveling from an upper part to a lower part in the work chamber, and air discharge means for discharging air of the unidirectional airflow from a lower part of the work chamber are provided, and moreover, a bulkhead provided in parallel with a peripheral wall portion of the work chamber along the air of the unidirectional airflow and longitudinal air outlets opened along a width direction of a lower end portion in a lower part of the lower end portion of the bulkhead and attached so as to oppose an air inlet portion by a filter unit for air purification is provided.

18 Claims, 22 Drawing Sheets

(56) References Cited

U.S. PATENT DOCUMENTS

| | | | |
|---|---|---|---|
| 4,699,640 A * | 10/1987 | Suzuki et al. | 55/385.2 |
| 5,487,768 A * | 1/1996 | Zytka et al. | 55/385.2 |
| 6,033,301 A * | 3/2000 | Suwa | 454/187 |
| 6,777,355 B2 * | 8/2004 | Kisakibaru et al. | 438/800 |
| 6,817,941 B1 * | 11/2004 | Gatov | 454/187 |
| 8,157,882 B2 * | 4/2012 | Curtis et al. | 55/505 |
| 8,728,187 B2 * | 5/2014 | Ono | 55/385.2 |
| 2014/0106657 A1 * | 4/2014 | Urban | 454/56 |

FOREIGN PATENT DOCUMENTS

| | | |
|---|---|---|
| JP | 19130-1988 | 2/1988 |
| JP | 7-63387 | 3/1995 |
| WO | 2007/111143 A1 | 10/2007 |

* cited by examiner

ISOLATOR DEVICE

TECHNICAL FIELD

The present invention relates to an isolator device and particularly to an isolator device with a high level of safety which can be used in a work in which the inside is kept in an aseptic state and in a work for handling a substance which might affect a human body inside.

BACKGROUND ART

In a work performed in a clean atmosphere such as a work in a manufacturing stage of a semiconductor and an electronic component or a work in a manufacturing stage of pharmaceuticals, for example, the work is performed in a clean work environment where the inside is kept in an aseptic and dustless state so that contaminants do not intrude from the outside environment. If the work environment in which such work is performed is small-sized, an isolator device in which a chamber or the like sealed from the outside environment is used and a worker can perform the work through a glove or a half suit from outside this chamber is used. Such isolator devices are particularly called aseptic isolators.

On the other hand, a work handling a substance affecting a human body such as a work in a manufacturing stage of pharmaceuticals, a work handling highly toxic microorganisms in the medical and biological fields or a work handling radioactive substances, for example, it is necessary to protect the workers from contamination of chemical substances, microorganisms and the like affecting a human body or to prevent leakage of these chemical substances, microorganisms and the like affecting a human body from the work environment to the outside environment. In such works, the isolator device in which a work can be performed through a glove or a half suit from outside the chamber sealed from the outside environment is used. Such isolator devices are particularly called containment isolators.

The isolator device is shielded from the outside environment where workers perform a work in an airtight manner, purifies outside air by a filter and supplies it into the chamber and also purifies the air in the chamber by the filter and discharges it to the outside. Therefore, such isolator device can be also used basically both as the aseptic isolator and the containment isolator.

Moreover, when the isolator device is to be used, safety can be further improved by adjusting an air pressure in the chamber in accordance with the purpose. That is, when the isolator device is used as an aseptic isolator, the pressure in the chamber is set to a pressure higher than an outside air pressure (hereinafter referred to as a positive pressure), and even in the case of leakage from the chamber, since the air flows from the chamber side to the outside, airborne bacteria and the like are prevented from intruding into the chamber from the outside On the other hand, if the isolator device is to be used as the containment isolator, the pressure in the chamber is set to a pressure lower than the outside air pressure (hereinafter referred to as a negative pressure) in use, and even in the case of the leakage from the chamber, since the air flows from the outside into the chamber, the chemical substances and the like in the chamber are prevented from contaminating the outside environment.

However, in the isolator device, a glass window through which the inside of the chamber can be visually checked from outside, a glove with which the worker performs the work, and an opening/closing door by which equipment is carried into the chamber or maintenance works are performed are provided. Therefore, it is difficult to completely shield the chamber of the isolator device in an airtight manner, and the shielding performance might be destroyed during operation of the isolator device. Moreover, even if the air pressure in the chamber is adjusted, there is limitation in providing a pressure difference all the time due to various factors such as fluctuation of the outside air pressure.

If any leakage is caused in the isolator device as above, in the aseptic isolator, the aseptic/dustless state in the chamber cannot be maintained, while in the case of the containment isolator, the chemical substances, microorganisms and the like handled in the chamber might leak to the outside environment.

As a method for avoiding such a risk during operation of the isolator device, Patent Literature 1 discussed below proposes a cleanliness maintaining device of an isolator device in which a negative pressure air suction passage whose pressure becomes negative both to the inside of the chamber and the outside is installed on an inner peripheral edge of a joint portion provided in the chamber, and the air passing through the inner peripheral edge of the joint portion is sucked by the negative pressure air suction passage.

On the other hand, works accompanying risks after the operation of the isolator device finished include a work of replacing a used filter. For example, in the containment isolator device, the chemical substances and the like in the air are removed via the filter for purifying the air therein and the purified air is discharged to the outside environment. As a result, leakage of the chemical substances and the like handled inside the isolator device and the like to the outside environment is prevented.

As such filters for purifying the air, high performance filters such as HEPA filters and ULPA filters are used, and a large quantity of the chemical substances and the like removed from the air adhere to the used filters. Therefore, when these used filters are to be replaced, a careful work is required for protecting safety of the worker and for preventing leakage to the outside environment.

A method employed most widely in this filter replacement work is a bag-in/bag-out method, but in this prior-art method, a structure of a housing accommodating the filter becomes complicated, and the filter replacement work becomes cumbersome.

Moreover, the inside of the housing is divided by the filter, the chemical substances and the like adhere to a surface on the upstream side of the filter along the air flow, while a surface on the downstream side of the filter is not contaminated. In such a state, the used filter is removed from a mounting plate in the housing and accommodated in the bag, but there is a concern that the chemical substances and the like adhering to the surface on the upstream side of the filter contaminate a downstream portion of the filter in the housing in a stage until the filter is accommodated in the bag.

If the downstream portion of the filter in the housing is contaminated by the chemical substances and the like as above, the chemical substances and the like having contaminated the downstream portion of the filter in the housing might leak to the outside environment when the isolator device and the like is operated after the filter replacement.

As a method for avoiding such risk, a safe filter housing replacing method is proposed in Patent Literature 2 discussed below in which the housing accommodating the used filter is removed with the housing and replaced by a new housing accommodating a new filter.

In this filter housing replacing method, the air in the room such as the isolator device is sucked through an air inlet opened on the housing upper face, the air is purified by a filter accommodated in the housing, and the purified air is discharged through an air outlet opened in the housing side face. Here, the housing air inlet is detachably connected to an insertion port of a work chamber of the isolator device and the like, while the air outlet of the housing is detachably connected to a discharge-side duct.

When this housing is to be replaced, first, a filter upstream portion which is a contaminated portion in the housing is sealed by placing a lid on the air inlet on the work chamber side of the isolator device and the like. Subsequently, the inside of the work chamber is washed and then, the air inlet of the housing is removed from the insertion port of the work chamber. Moreover, the air outlet of the housing is removed from the discharge-side duct, and the lid is placed thereon.

With this filter housing replacing method, the filter replacement work is relatively easier than the prior-art bag-in/bag-out method, and risk of contaminating the outside environment during the removal work of the housing can be reduced. Moreover, since both the air inlet/outlet of the removed housing are sealed, the outside environment is not contaminated.

PRIOR-ART REFERENCES

Patent Literature

Patent Literature 1: Japanese Patent Laid-Open No. 2000-346418
Patent Literature 2: WO2007/131376

SUMMARY OF THE INVENTION

Problems to be Solved by the Invention

The cleanliness maintaining device for the isolator device proposed in the above-described Patent Literature 1 as a method of avoiding risk during operation of the isolator device is to provide an aseptic isolator intended to maintain a high-level aseptic/dustless state and not intended to provide a containment isolator. Moreover, in order to maintain high-level safety in this cleanliness maintaining device, a negative pressure air suction passage needs to be provided at each of all the joint portions of the isolator device, which makes the structure of the device complicated and raises a maintenance cost of the isolator device, which are problems.

Moreover, in the description of the above-described Patent Literature 1, a double-wall type isolator device provided with the above-described cleanliness maintaining device is proposed, and this isolator device is described to provide an inner wall forming a gap between itself and a device housing as an air circulating path, and a rising current is formed in this circulating path so that even if contaminant air intrudes from the outside, it is shielded by the circulating path and shielding performances are improved (paragraph numbers 0030 to 0031 in the description of the literature).

This double-wall type isolator device is applied to an aseptic isolator, the air flowing through the circulating path is sucked from inside the device, and that cannot be applied to the containment isolator in which the air in the device contains the chemical substances and the like.

On the other hand, as a method for avoiding risk after the operation of the isolator device is finished, the filter housing replacing method proposed in the above-described Patent Literature 2 requires a dedicated housing having a complicated structure and raises a manufacturing cost. Moreover, at the filter replacement, not only the used filter but also the dedicated housing itself are disposed of, and there is a problem that a maintenance cost of the isolator device including a disposal cost is raised.

On the other hand, the high performance filters such as the HEPA filter, the ULPA filter and the like are subjected to leak inspection in order to confirm that rated trapping efficiency after the manufacture is satisfied and there is no leakage in the filter. These leak inspecting methods include U.S. standard IEST-RP-CC006.2, ISO CD 14644-3 (1998), for example, and in these methods, a scan test for air discharge surfaces of individual filters which are replacement components are required.

As a method of this scan test, test air in which test particles are mixed from the upstream side of a test filter is supplied to the entire suction surface of the test filter, and the particles transmitted by the test filter are detected by a particle detector scanning the air discharge surface on the downstream side of the test filter. In this scan test, if there are a large quantity of detected particles at a specific spot, occurrence of leakage at the spot can be confirmed.

However, in the above-described filter housing replacing method, the filter is fully contained in the dedicated housing having a complicated structure, and the air discharge surface of the filter is not exposed to the outside of the housing. Therefore, the particle detector in the scan test cannot scan the air discharge surface of the filter.

Thus, the individual filters before being accommodated in the housing can be subjected to the scan test but check for completeness by the scan test cannot be conducted in a state incorporated in the housing. Therefore, there is a problem that safety of the filter housing itself which is a replacement component of the filter housing replacing method cannot be checked.

Thus, the present invention has an object to provide an isolator device which can cope with the risk during the operation of the isolator device and can ensure high-level safety with a simple structure and maintain high-level aseptic/dustless state as an aseptic isolator and at the same time, can prevent leakage of chemical substances, microorganisms and the like to the outside environment at a high level as a containment isolator.

Moreover, the present invention has an object to provide an isolator device provided with a filter unit for air purification, which can cope with the risk after the operation of the isolator device is finished, the filter replacement work thereof being easy, has low risk of contaminating the outside environment by the replacement work, a maintenance cost of the isolator device with the simple structure including a manufacturing cost and a disposal cost being low, and moreover, whose safety can be easily checked by conducting a check of completeness by using the scan test.

Means for Solving the Problems

In order to solve the above-described problems, the inventors examined a relationship among a bulkhead provided in a chamber, an airflow flowing through the chamber, and a position of an air outlet provided in the chamber in a double-wall type isolator device in order to cope with risk during operation of an isolator device, found that the objects of the present invention can be achieved as the result of keen study and have completed the present invention.

That is, the isolator device according to an embodiment of the present invention is characterized in that, in an isolator device provided with:

a work chamber (10);

air supply means (20) for supplying unidirectional airflow traveling from an upper part to a lower part in the work chamber; and air discharge means (30) for discharging the unidirectional airflow from a lower part of the work chamber, characterized by having:

a bulkhead (11a) provided in parallel with a peripheral wall portion (10a) of the work chamber along the unidirectional airflow; and a longitudinal air outlet (18a, 18b) opened along a width direction of a lower end portion in a lower part of the lower end portion of the bulkhead.

According to the above-described configuration, the air in one direction airflow (so-called laminar airflow) traveling from the upper part to the lower part is supplied by the air supply means in the work chamber. In this work chamber, the bulkhead is provided in a direction along the flow of the unidirectional airflow. This bulkhead is formed in parallel with the peripheral wall portion of the work chamber and divides an internal space of the work chamber to a central space from the bulkhead (hereinafter referred to as a central space) and a space between the bulkhead and the peripheral wall portion (hereinafter referred to as a peripheral space). Therefore, the air of the unidirectional airflow traveling from the upper part to the lower part in the work chamber flows as the air in the unidirectional airflow traveling from the upper part to the lower part in the central space and the air of the unidirectional airflow traveling from the upper part to the lower part in the peripheral space.

Moreover, the air outlet is opened below the lower end portion of the bulkhead, that is, on the downstream side of the air of each unidirectional airflow in the longitudinal state in the width direction of the lower end portion. As a result, since the air of each unidirectional airflow flowing from the upper part to the lower part in the central space and the peripheral space does not change the flowing direction, the air is discharged through the air outlets without disturbing the laminar state.

The work performed in the isolator device configured as above is performed in the central space, and the peripheral space is formed between this central space and the outside environment. In this state, the clean air supplied from the air supply means flows independently in the central space and the peripheral space, and the air is discharged through the air outlets, respectively.

Therefore, if the isolator device is used as an aseptic isolator, airborne bacteria and the like entering the peripheral space from the outside environment are discharged through the air outlet along the clean air of unidirectional airflow flowing in the peripheral space. As a result, the aseptic/dustless state in the central space is not contaminated, and high-level safety of the aseptic isolator can be maintained.

On the other hand, if the isolator device is to be used as a containment isolator, the chemical substances and the like leaking out of the central space to the peripheral space are discharged through the air outlet along the clean air of unidirectional airflow flowing in the peripheral space. As a result, the chemical substances and the like do not leak to the outside environment and high-level safety of the containment isolator can be maintained.

Thus, the invention in one embodiment is an isolator device which can cope with risk during operation of the isolator device and can ensure high-level safety with the simple structure, and an isolator device in which the high-level aseptic/dustless state can be maintained as an aseptic isolator and at the same time, leakage of the chemical substances, microorganisms and the like to the outside environment can be prevented at the high level as a containment isolator can be provided.

Moreover, the present invention may further be characterized by having:

another bulkhead (11b) provided in parallel with another peripheral wall portion (10b) opposite to the peripheral wall portion; and longitudinal other air outlets (18c, 18d) opened in the width direction of the lower end portion in the lower part of the lower end portion of the above-described another bulkhead.

According to the above-described configuration, the bulkheads are provided in parallel on the two opposing peripheral wall portions of the isolator device, respectively, and the air outlet is opened in the lower part of the lower end portion of each bulkhead. As a result, the air in the unidirectional airflow traveling from the upper part to the lower part in the central space is discharged separately through the two air outlets opened in the opposing directions, and the air in the work chamber flows more stably and is discharged through the air outlets.

Thus, in the invention described in claim 2, too, the same working effects as those in the invention described in claim 1 can be further achieved.

Moreover, the present invention may further be characterized in that the air outlet is formed in a bottom wall portion of the work chamber and opened immediately below the lower end portion or closer to the center of the work chamber than the spot immediately below.

According to the above-described configuration, the air outlet is formed in the bottom wall portion of the work chamber and opened immediately below the lower end portion of the bulkhead or closer to the central space than the spot immediately below. As described above, the central space is a space where the work is performed and naturally occupies a volume larger than the peripheral space. Therefore, a flow rate of the air flowing in the central space is larger than the flow rate of the air flowing in the peripheral space, and since the air outlet is opened immediately below the lower end portion of the bulkhead or closer to the central space than the spot immediately below, the air in the work chamber flows more stably and is discharged through the air outlet.

Thus, in the invention as just described, too, the same working effects as those in the invention described in other embodiments can be further achieved.

Moreover, the present invention may further be characterized in that the air outlet is composed of one or two or more opening portions for the bulkheads, respectively; and the total of the longitudinal opening lengths of the one or two or more opening portions is at a rate of 50 to 100% to the length in the width direction of the lower end portion.

According to the above-described configuration, the air outlet provided in each bulkhead may be composed of one opening portion or may be composed separately of two or more opening portions. Moreover, the total of the longitudinal opening lengths of these opening portions is preferably a predetermined length or more. As a result, the air having flowed along the bulkhead stably flows without largely changing the direction thereof and is discharged through the air outlet.

Thus, in the invention as just described, the same working effects as those in other embodiments of the invention can be further achieved.

Moreover, the present invention is the isolator device described in any one of claims 1 to 4 according to description in claim 5, characterized in that the air supply means has a rectifying member (23) forming air in the unidirectional airflow;

the rectifying member is provided with a frame body (24) formed of a plurality of frame materials (24*a*) and porous sheets (25*a*, 25*b*) fixed to the frame material so as to cover an upper face and a bottom face of this frame body;

the frame material is provided with a plurality of through ports (24*b*) penetrating from the upper face to the bottom face thereof; and the porous sheet covers only either one of opening portions, that is, an opening portion of the through port and also an upper face opening portion or a bottom face opening portion of the frame material in a portion brought into contact with the frame material and fixed to the frame material.

According to the above-described configuration, the air supply means has the rectifying member composed of the frame body and the porous sheet covering the upper face and the bottom face of this frame body. The air supplied into the work chamber by the air supply means can pass through the portion of the porous sheet (central portion of the rectifying member) of this rectifying member, and thus, the flow is rectified and forms air in the unidirectional airflow traveling from the upper part to the lower part in the work chamber.

On the other hand, the portion of the frame body in the rectifying member (the peripheral edge portion of the rectifying member) cannot transmit air. This can make supply of air in uniform unidirectional airflow over the entire internal space of the work chamber difficult. Thus, in the frame material constituting the frame body, a plurality of through ports penetrating from the upper face to the bottom face are provided. As a result, air can be also supplied through the portions of the through ports penetrating the frame material.

However, even if the plurality of through ports are provided in the frame material, air does not pass through the portion where the through port of the frame material is not opened. Thus, the flow rate of the air from the entire frame material (apparent flow rate) becomes equal to the flow rate of the air from the portion of the through port. Thus, a difference is given to the number of covering porous sheets between the central portion and the peripheral edge portion (portion of the through port) of the rectifying member. That is, it is configured such that the central portion of the rectifying member is covered by the porous sheet at two spots on the upper face and the bottom face, while the peripheral edge portion (the portion of the through port) is covered by the porous sheet only at either one of the upper face opening portion and the bottom face opening portion.

As a result, passage resistance of air in the portion of the through port becomes smaller than the passage resistance of air in the central portion of the rectifying member, and the flow velocity of the air in the portion of the through port becomes higher than the flow velocity of the air in the central portion. As a result, the flow rate of air in the portion of the through port becomes larger than the flow rate of the air in the central portion. Therefore, the difference between the flow rate of the air in the central portion of the rectifying member and the flow rate of the air in the peripheral edge portion (apparent flow rate) becomes small, and the air passing through the rectifying member becomes the air of the unidirectional airflow traveling from the upper part to the lower part in the work chamber from the entire rectifying member and flows more stably.

Thus, in the invention as just described in the embodiment above, the same working effects as those in the invention described in other embodiments can be further achieved.

Moreover, the present invention may be further characterized in that the porous sheet is membrane screen having a large number of fine pores through which the front and the back communicate with each other.

According to the above-described configuration, the porous sheet has a large number of fine pores through which the front and the back communicate with each other. As a result, the air passing through the rectifying member is rectified in flow by these fine pores and forms the air of stable unidirectional airflow.

Thus, in the invention as just described, the same working effects as those in the invention described in other embodiments can be further achieved.

Moreover, the present invention may be further be characterized in that in the air flowing while passing through the rectifying member when a predetermined amount of air is supplied to the rectifying member, the through port is opened in the frame material, assuming that a flow velocity of the air passing through a portion in the upper face opening portion or the bottom face opening portion covered by the porous sheet where the porous sheet has a single layer is V1; and a flow velocity of the air passing through a portion where the porous sheet is not brought into contact with the frame material and the porous sheet has double layers is V2;

an opening rate X(%) of the opening portion covered by the porous sheet to an area of the upper face or the bottom face of the frame material satisfies the following expression:

$$X=(V2/V1)\times 100.$$

According to the above-described configuration, the opening rate X (%) of the through port provided in the frame material can be acquired by the above expression. As a result, when the rectifying member is designed, the flow rate of the air in the central portion and the flow rate of the air in the peripheral edge portion (apparent flow rate) of the rectifying member can be adjusted more accurately by measuring the flow velocity of the air in the portion where the porous sheet has a single layer and the flow velocity of the air in the portion where the porous sheet has double layers. As a result, the air passing through the rectifying member becomes air in the unidirectional airflow traveling from the upper part to the lower part in the work chamber from the entire rectifying member and flows further stably.

Thus, in the invention as just described, the same working effects as those in the invention described in other embodiments can be further achieved.

Moreover, the inventors have found that the objects of the present invention can be achieved by devising the structure of the filter unit for air purification to be attached to the air outlet of the double-wall type isolator device in response to the risk after the operation of the isolator device is finished and completed the present invention.

That is, the present invention may further be characterized in that the air discharge means (260) is provided with a filter unit (210) for air purification detachably attached to a channel of air in the unidirectional airflow discharged from the longitudinal air outlet (262);

the filter unit for air purification includes:
a rectangular cylindrical body (211) having a first wall portion provided with a longitudinal air inlet portion (214) through which the air is introduced and a second wall portion formed so as to cross the first wall portion and provided with an air discharge port portion (213) through which the air introduced from the air inlet portion is discharged; and
a filter member (212) provided in the air discharge port portion so as to constitute an outer wall surface of the air discharge port portion and filtering the air introduced as above; and
this filter unit for air purification is attached to the outside of the work chamber so as to oppose the air inlet portion to the air outlet.

According to the above-described configuration, the filter unit for air purification provided in the air discharge means is detachably attached in the channel of the air discharged from the work chamber and can trap chemical substances and the like used in the work chamber and harmful to a human body from the air flowing through this channel inside the filter unit.

Moreover, the filter unit for air purification is directly attached from the outside to the work chamber through the air outlet opened in the work chamber. As a result, the chemical substances and the like discharged from the work chamber can be efficiently trapped immediately after the discharge.

Moreover, this air outlet is longitudinally opened in the bottom wall portion of the work chamber, and the air inlet of the filter unit is also formed having a longitudinal shape in accordance with the shape of this air outlet. As a result, safety and workability in maintenance such as a replacement work of the filter unit are improved.

Here, the filter unit for air purification is integrally composed of a cylindrical body and a filter member. The air discharge surface of this filter member constitutes the outer wall surface of the air discharge port portion, and thus, the air suction surface of the filter member is accommodated inside the cylindrical body. As described above, the filter unit for air purification according to the present invention has a simple structure and can be attached as each filter unit to the channel of the air discharged from the work chamber handling the chemical substances and the like harmful to human bodies.

In the above-described filter unit, the air containing the chemical substances and the like discharged from the work chamber is guided into the filter unit from the air inlet portion. This air guided into the filter unit is sucked from the air suction surface of the filter member and filtered and discharged to the outside of the filter unit from the air discharge surface of the filter member. As a result, the chemical substances and the like filtered by the filter member adhere to the air suction surface of the filter member and are trapped inside the filter unit.

Subsequently, when the filter unit is to be replaced, the inside of the filter unit can be simply sealed by closing the air inlet portion. As a result, leakage of the chemical substances and the like trapped inside the filter unit to the outside environment can be prevented. Therefore, by replacing the filter unit as a whole, the filter replacement work can be performed easily, and also the risk of contaminating the outside environment by the replacement work can be kept low.

Moreover, as described above, the filter unit for air purification has a simple structure composed of the cylindrical body and the filter member. Therefore, this filter unit has a low manufacturing cost, and a disposal cost is also low when the entire filter unit is disposed of. Thus, the maintenance cost of the isolator device including the manufacturing cost and the disposal cost can be kept low.

Furthermore, by opening the air inlet portion in the longitudinal state, the shape of the first wall portion in which this air inlet portion is opened is formed having a longitudinal rectangular shape, the long side thereof is made longer, and the short side can be kept short. The boundary on the long side of this first wall portion is crossed by the second wall portion, and this filter member is provided on the second wall portion.

Therefore, the length of the long side of the first wall portion determines the size of the air discharge surface of the filter member. On the other hand, the short side of the first wall portion is located in the direction crossing the air discharge surface of the filter member, and the length of this short side determines the depth of the filter unit. Thus, by forming the first wall portion having a longitudinal rectangular shape, the area of the air discharge surface of the filter unit can be made larger and the depth can be made smaller.

As a result, the shape of the filter unit becomes compact, while the area of the air discharge surface can be made larger. Therefore, when being attached to the air discharge path of the air discharged from the work chamber, there is no restriction in place and freedom in designing the isolator device can be improved.

Moreover, as described above, the air discharge surface of the filter member constitutes the outer wall surface of the air discharge port portion. The air discharge surface of this filter member forms a plane and can be subjected to the scan test similar to the leak test for usual HEPA filters and the like. As a result, in the leak test for the filter unit itself, the check for completeness by the scan test for this air discharge surface can be conducted by the prior-art methods.

Thus, the invention can provide the isolator device provided with the filter unit for air purification which can cope with the risk after the operation of the isolator device is finished, the filter replacement work thereof being easy, has low risk of contaminating the outside environment by the replacement work, a maintenance cost of the isolator device with the simple structure including a manufacturing cost and a disposal cost being low, and moreover, whose safety can be easily checked by conducting the check of completeness by using the scan test.

Moreover, the present invention may further be characterized in that
the filter unit for air purification is provided with another filter member;
the cylindrical body has a third wall portion formed so as to oppose the second wall portion and provided with another air discharge port portion for discharging the introduced air; and
the another filter member is provided in the another air discharge port portion so as to constitute the outer wall surface of the another air discharge port portion on the air discharge surface thereof and discharges the filtered air.

According to the above-described configuration, the filter unit for air purification has two air discharge port portions in the opposing two wall portions, and the filter member is provided in each of these air discharge port portions. As a result, the filter unit can take a large ventilation area, and filtering efficiency is improved. In other words, a filter capacity required for the filter unit is reduced, and a compact filter unit can be configured.

Thus, in the invention as just described, too, the same working effects as those in the invention described in other embodiments can be achieved and at the same time, the isolator device provided with a compact filter unit for air purification with favorable filtering efficiency can be provided.

Moreover, the present invention may further characterized in that the filter unit for air purification is provided with:
a detachable lid body (216) closing the air inlet portion; and
a packing (216a) interposed in an airtight manner between an outer peripheral edge portion of this lid body and an inner peripheral edge portion of the air inlet portion.

According to the above-described configuration, the cylindrical body of the filter unit is provided with the lid body closing the air inlet portion and the packing which seals this lid body to the air inlet portion. Therefore, when the used filter unit is to be removed from the aid discharge path for replacement, by attaching this lid body in a sealing manner, leakage of the chemical substances and the like trapped inside the filter unit to the outside environment can be further suppressed.

Thus, in the invention as just described, the same working effects as those in the invention described in other embodiments can be further achieved.

Moreover, the present invention may further be characterized in that the filter unit for air purification has
an opening/closing member (516) provided with a plurality of flexible sheets (516a, 516b) extended inward from the outer peripheral edge portion of the air inlet portion and closing the air inlet portion capable of opening/closing the same.

According to the above-described configuration, instead of the detachable lid body, the opening/closing member having flexible sheets is fixedly provided. This opening/closing member is usually in a state for closing the air inlet portion, but this opening/closing member has a plurality of flexible sheets and can open the air inlet portion by pushing and bending these flexible sheets.

Therefore, when the filter unit is attached to the air discharge channel for purifying air, these flexible sheets are pushed and bent so as to open the air inlet portion. On the other hand, when the used filter unit is to be removed from the air discharge path for replacement, these flexible sheets recover and close the air inlet portion. As a result, leakage of the chemical substances and the like trapped inside the filter unit to the outside environment can be further suppressed.

Thus, in the invention as just described, the same working effects as those in the invention described in other embodiments can be further achieved.

Reference numerals in parentheses in each of the above-described means indicate correspondence with specific means described in embodiments which will be described later.

BRIEF DESCRIPTION OF THE DRAWINGS

FIG. 5 are outline diagrams of the state where the air is sucked to the air outlet when seen from the side face, in which

FIG. 6 are outline diagrams of a state where the air is sucked to the air outlet when seen from the side face, in which

BEST MODE FOR CARRYING OUT THE INVENTION

Each embodiment of an isolator device according to the present invention will be described below on the basis of the attached drawings.

<First Embodiment>

Figure 1:
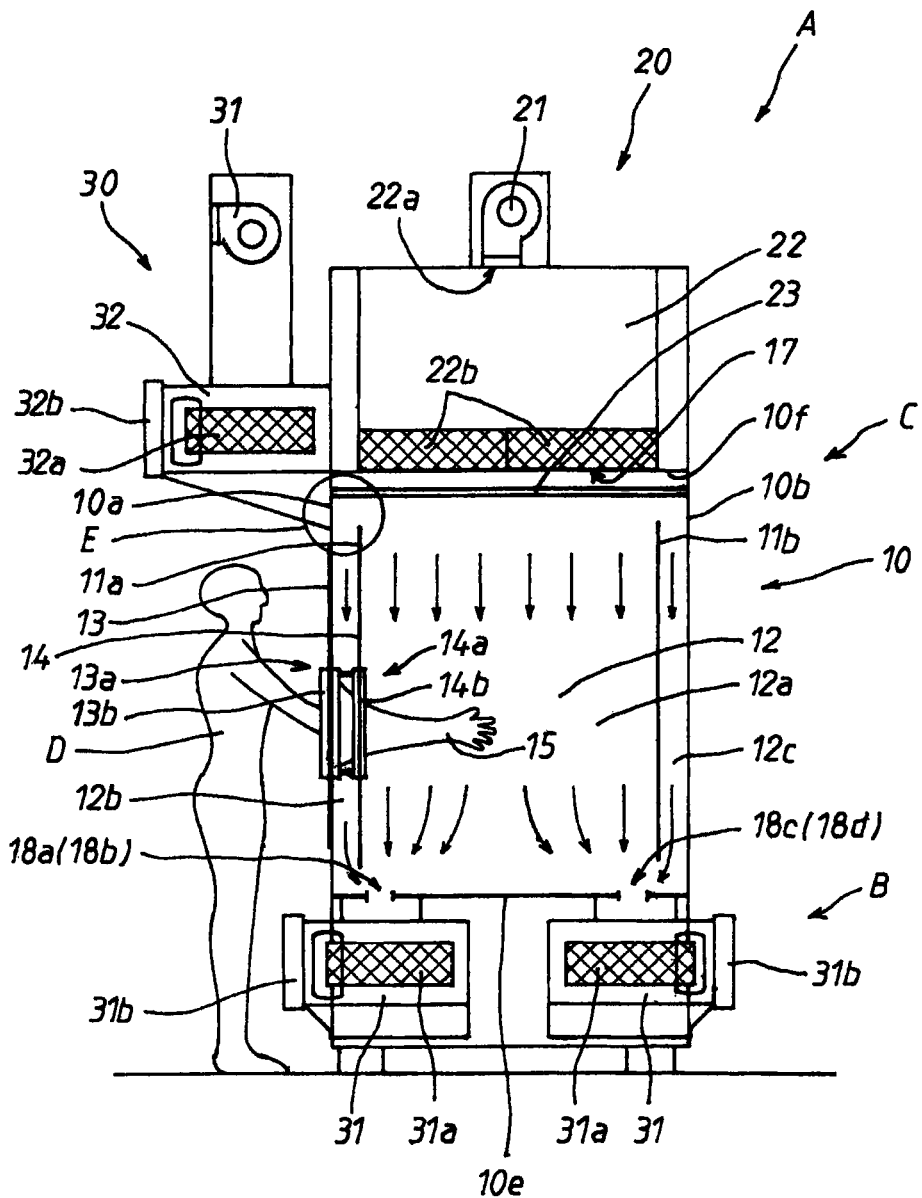
FIG. 1 is an outline diagram of an inside of an isolator device according to a first embodiment of the present invention when seen from a side face.

FIG. 1 is an outline diagram illustrating an inside of the isolator device according to the present invention when seen from a side face, and the isolator device A is composed of a rack B placed on a floor surface and an isolator main body C placed on this rack B.

The rack B has its periphery covered by a wall material made of a stainless metal plate, and four (only two of them are shown) air-discharge primary filter units 31 (which will be described later), electric components and a machine room (not shown) are accommodated therein.

The isolator main body C is provided with a chamber 10, an air feed mechanism 20, and an air discharge mechanism 30.

The chamber 10 is formed of a box body constituted by stainless metal plates and is shielded in an airtight manner from the outside environment where a worker D performs a work except an air inlet and an air outlet which are limited. This chamber 10 is provided with a spray nozzle for washing liquid for washing the inside and a drain groove (none of them is shown).

Figure 2:
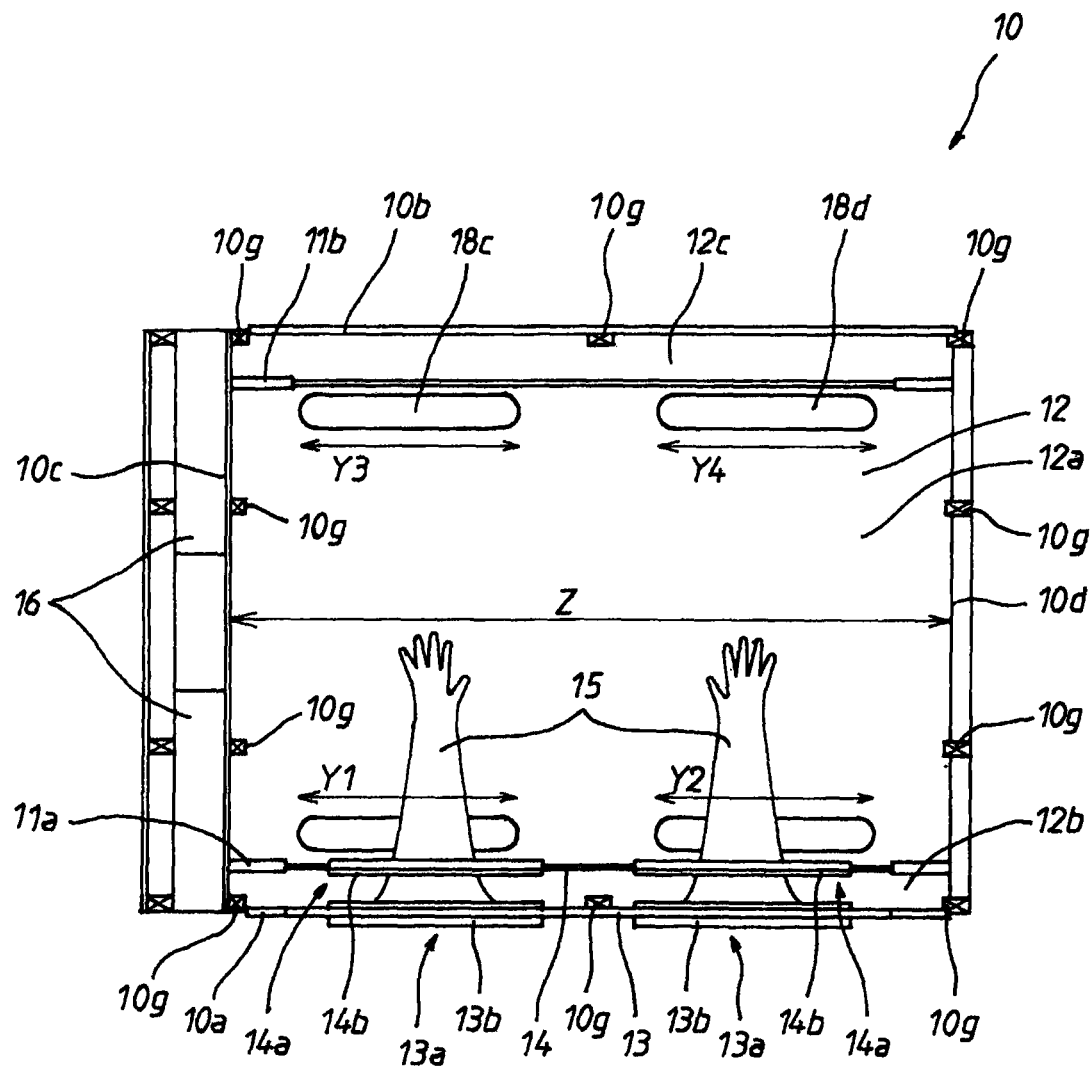
FIG. 2 is an outline diagram of the inside of the isolator device illustrated in FIG. 1 when seen from an upper face.

FIG. 2 is an outline diagram of the inside of the isolator device A when seen from an upper face, in the chamber 10, a front bulkhead 11a and a rear bulkhead 11b are disposed in a front wall portion 10a and a rear wall portion 10b of the chamber 10, in parallel with the both wall portions 10a and 10b, respectively. The both bulkheads 11a and 11b are supported by both side wall portions 10c and 10d so that both right and left end portions are brought into contact with both right and left opposing side wall portions 10c and 10d of the chamber 10, respectively.

Moreover, both bulkheads 11a and 11b do not have their lower end portions brought into contact with the respective opposing bottom wall portion 10e of the chamber 10 but are separated from each other with a given space. Moreover, the both bulkheads 11a and 11b do not have their upper end portions brought into contact with a rectifying plate 23 (which will be described later) provided on the lower part of an opposing upper wall portion 10f of the chamber 10 but are separated from each other with a given space (See FIG. 1).

As described above, an internal space 12 of the chamber 10 is divided by the both bulkheads 11a and 11b provided inside the chamber 10 into a space between the both bulkheads 11a and 11b (hereinafter referred to as a central space 12a) and two spaces between the both bulkheads 11a and 11b and the both front and rear wall portions 10a and 10b (hereinafter referred to as peripheral spaces 12b and 12c).

In the front wall portion 10a of the chamber 10, a transparent glass window 13 is provided, and in the front bulkhead 11a provided in parallel with the front wall portion 10a, too, a transparent glass window 14 is provided. As a result, the worker D standing in front of the chamber 10 can visually check the inside of the chamber 10 through the glass window 13 and the glass window 14 (See FIG. 1).

The glass window 13 provided in the front wall portion 10a has two opening portions 13a for work which makes the outside communicate with the internal space 12 of the chamber 10. Moreover, the glass window 14 provided in the front bulkhead 11a has two auxiliary opening portions 14a which make central space 12a communicate with the peripheral space 12b at a position opposite to the opening portion 13a for work. At each of the opening portions 13a for work, a base end portion of a glove 15 made of resin is attached by a mounting frame 13b in an airtight manner, respectively, and moreover, these gloves 15 are also attached to each of the auxiliary opening portions 14a by auxiliary frames 14b and distal end portions thereof are inserted into the central space 12a (See FIG. 2).

Outside the left side wall portion 10c of the chamber 10, a duct 16 communicating with four air-discharge primary filter units 31 accommodated in the rack B is provided by being oriented upward along a left side face of the chamber 10 (See FIG. 2).

Moreover, in the bottom wall portion 10e of the chamber 10, two each of air outlets 18a to 18d are opened in a the lower part of the lower end portion of each of the bulkheads 11a and 11b, respectively (See FIG. 2). These air outlets 18a to 18d are provided longitudinally in a width direction of the lower end portion of each of the bulkheads 11a and 11b and formed at positions closer to the center than immediately below the lower end portion of each of the bulkheads 11a and 11b, that is, closer to the central space 12a.

The air feed mechanism 20 is provided with an air feeding blower 21 for supplying outside air into the chamber 10, an air feeding filter unit 22 for filtering the air supplied from this air feeding blower 21, and the rectifying plate 23 in the chamber 10 for rectifying the air filtered by the air feeding filter unit 22 and supplying the air into the chamber 10 (See FIG. 1).

The air feeding blower 21 is connected to the outer side of the air feeding filter unit 22 through a primary air inlet 22a (not shown) opened in the upper wall portion of the air feeding filter unit 22. The air discharged from this air feeding blower 21 is supplied to the internal space of the air feeding filter unit 22.

The air feeding filter unit 22 is provided on the upper part of the chamber 10 through a secondary air inlet 17 opened in the upper wall portion 10f of the chamber 10. This air feeding filter unit 22 is provided with an HEPA filter 22b for filtering the air supplied from the air feeding blower 21, faced with the secondary air inlet 17. The air purified by this HEPA filter 22b is supplied to the internal space 12 of the chamber 10 through the rectifying plate 23 provided over the whole surface on the upper portion of the internal space 12 of the chamber 10 on the lower portion of the HEPA filter 22b (See FIG. 1).

The rectifying plate 23 is provided with a large number of fine pores on the surface thereof through which the front and the back communicate with each other and uniformizes the flow of the air supplied to the chamber 10. As a result, the air supplied from the HEPA filter 22b forms air of a unidirectional airflow (so-called laminar flow) traveling from an upper part to a lower part in the internal space 12 of the chamber 10 through the rectifying plate 23.

The air discharge mechanism 30 is provided with an air-discharge primary filter unit 31 for purifying the air in the internal space 12 of the chamber 10, an air-discharge secondary filter unit 32, and an air discharge blower 33 for discharging the purified air to the outside of the chamber 10.

The air-discharge primary filter unit 31 is, as described above, accommodated in number of four in the rack B, each communicating with the chamber 10 through the four air outlets 18a to 18d opened in the bottom wall portion 10e of the chamber 10 (See FIG. 2). This air-discharge primary filter unit 31 is provided with an HEPA filter 31a for filtering the air discharged from the air outlets 18a to 18d. Moreover, in this air-discharge primary filter unit 31, an opening/closing door 31b for replacing the HEPA filter 31a inside in a sealed manner and capable of being opened/closed on a front face and a rear face of the rack B (See FIG. 1).

The air-discharge secondary filter unit 32 is provided on the upper part of the chamber 10 and on the front part of the air feeding filter unit 22 and communicates with the air-discharge primary filter unit 31 through the duct 16. This air-discharge secondary filter unit 32 is provided with an HEPA filter 32a for further filtering the air filtered by the air-discharge primary filter unit 31. Moreover, this air-discharge secondary filter unit 32 has an opening/closing door 32b for replacing the HEPA filter 32a inside in a sealing manner and capable of being opened/closed (See FIG. 1).

The air discharge blower 33 is provided on the upper wall portion of the air-discharge secondary filter unit 32 while communicating with the upper-part opening portion of the air-discharge secondary filter unit 32. This air discharge blower 33 discharges the purified air filtered by the air-discharge primary filter unit 31 and the air-discharge secondary filter unit 32 to the outside of the chamber 10.

Here, in the isolator device A according to this first embodiment configured as above, the flow of air during the operation will be described.

First, if the air feeding blower 21 and the air discharge blower 33 are operated, the air discharged from the air feeding blower 21 has its pressure uniformized in the internal space of the air feeding filter unit 22 and supplied to the HEPA filter 22b as described above. The air purified in this HEPA filter 22b forms air in a unidirectional airflow traveling from the upper part to the lower part in the internal space 12 of the chamber 10 through the rectifying plate 23. The structure and action of this rectifying plate 23 will be described later.

In FIG. 1, the flow of air in the chamber 10 is described by using arrows. In FIG. 1, most of the purified air supplied downward through the rectifying plate 23 passes through the central space 12a in the internal space 12 of the chamber 10 and forms the air in the unidirectional airflow traveling from the upper part to the lower part. As a result, the air in the central space 12a where the worker D performs a work via the gloves 15 is discharged through the air outlets 18a to 18d opened in the bottom wall portion 10e of the chamber 10 along the unidirectional airflow traveling from the upper part to the lower part.

Therefore, if the isolator device A is used as an aseptic isolator, the aseptic/dustless air in the central space 45a is discharged through the air outlets 18a to 18d. On the other hand, if the isolator device A is used as a containment isolator, the air containing the chemicals and the like used in the work in the central space 12a is discharged through the air outlets 18a to 18d.

Moreover, the other part of the purified air supplied to the lower part through the rectifying plate 23 passes through the peripheral spaces 12b and 12c in the internal space 12 of the chamber 10 and forms the air in the unidirectional airflow traveling from the upper part to the lower part. The peripheral spaces 12b and 12c are separated from the central space 12a by the bulkheads 11a and 11b, and the worker D does not work therein.

Therefore, not only when the isolator device A is used as the aseptic isolator but also if it is used as the containment isolator, clean air flows through the peripheral spaces 12b and 12c all the time. The clean air flowing in the peripheral spaces 12b and 12c is discharged through the air outlets 18a to 18d opened in the bottom wall portion 10e of the chamber 10 along the unidirectional airflow traveling from the upper part to the lower part. In such a state, the central space 12a and the peripheral spaces 12b and 12c in the chamber 10 maintain a positive pressure with respect to the outside all the time.

In the isolator device according to the first embodiment configured as above, the working effects of the bulkhead and the air outlet will be described.

(Working Effect of Bulkhead)

First, consider a case where the isolator device A is used as an aseptic isolator. If leakage occurs from a joint portion provided in the front wall portion 10a of the chamber 10 or from the mounting frame 13b provided in the opening portion 13a for work, for example, and airborne bacteria and the like intrude into the chamber 10 from the outside, the airborne bacteria and the like are discharged through the air outlets 18a and 18b opened in the bottom wall portion 10e of the chamber 10 along with the clean air traveling from the upper part to the lower part in the peripheral space 12b. At this time, the peripheral space 12b is separated from the central space 12a by the bulkhead 11a, and the airborne bacteria and the like having intruded due to the leakage in the mounting frame 13b does not intrude into the central space 12a where the work is performed in the aseptic/dustless state.

In a case where the isolator device A is used as an aseptic isolator similarly, if leakage occurs from the joint portion provided on the bulkhead 11a or the auxiliary frame 14b provided in the auxiliary opening portion 14a, for example, the air in the unidirectional airflow traveling from the upper part to the lower part in the peripheral space 12b is clean air all the time, and even if the air leaks to the central space 12a from the leakage of the auxiliary frame 14b, the aseptic/dustless state is not contaminated.

On the other hand, consider a case where the isolator device A is used as a containment isolator. If leakage occurs from the joint portion provided on the bulkhead 11a or from the auxiliary frame 14b provided in the auxiliary opening portion 14a, for example, and chemicals and the like used in the central space 12a leak to the peripheral space 12b, the chemicals and the like are discharged through the air outlets 18a and 18b opened in the bottom wall portion 10e of the chamber 10 along with the clean air traveling from the upper part to the lower part in the peripheral space 12b. At this time, the peripheral space 12b is shielded from the outside environment by the front wall portion 10a of the chamber 10 in the airtight manner, and the chemicals and the like leaking from the auxiliary frame 14b do not contaminate the outside environment.

Moreover, if the isolator device A is similarly used as a containment isolator, if leakage occurs from the joint portion provided on the front wall portion 10a of the chamber 10 or from the mounting frame 13b provided on the opening portion 13a for work, for example, the air in the unidirectional airflow traveling from the upper part to the lower part in the peripheral space 12b is clean air all the time and even if the air leaks to the outside environment from the leakage of the mounting frame 13b, the outside environment is not contaminated.

As described above, the isolator device A according to this first embodiment can ensure high-level safety both as the aseptic isolator and the containment isolator.

Figure 3:
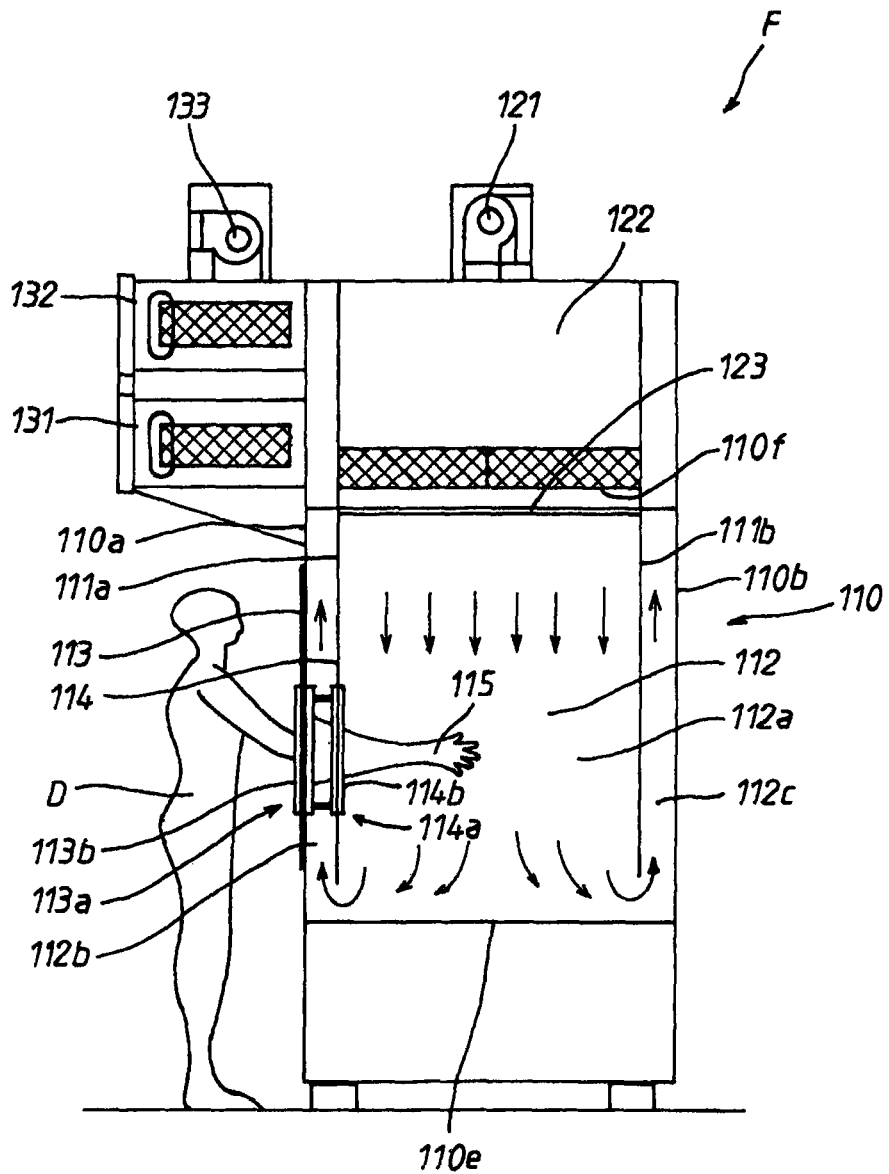
FIG. 3 is an outline diagram of a prior-art double-wall type isolator device when seen from the side face.

Here, in order to clarify the working effects of the isolator device A according to this first embodiment, the airflow of the prior-art double-wall type isolator device will be described. FIG. 3 is an outline view of the inside of a prior-art isolator device F seen from the side face. Flows of the air in a chamber 110 are described by using arrows in FIG. 3. When FIG. 3 is compared with FIG. 1, upper end portions of both bulkheads 111a and 111b are brought into contact with an upper wall portion 110f of the chamber 110. Moreover, no air outlet is provided in a bottom wall portion 110e of the chamber 110.

As a result, the air supplied into the chamber 110 through a rectifying plate 123 forms air in a unidirectional airflow traveling from an upper part to a lower part only in a central space 112a. This air in the unidirectional airflow traveling from the upper part to the lower part in the central space 112a reverses the flowing direction at lower end portions of the bulkheads 111a and 111b, flows from the lower part to the upper part in peripheral spaces 112b and 112c and is discharged to the outside by an air discharge blower 133 through air-discharge filter units 131 and 132.

Consider a case where this prior-art isolator device F is used as an aseptic isolator. If leakage occurs from a joint portion provided on a front wall portion 110a of the chamber 110 or from a mounting frame 113b provided in the opening portion 113a for work, for example, and airborne bacteria and the like intrude into the chamber 110 from the outside, the airborne bacteria and the like are discharged to the air-discharge filter units 131 and 132 provided on the front in the upper part of the chamber 110 along with the clean air supplied from the central space 112a and traveling from the lower part to the upper part in the peripheral space 112b. At this time, the peripheral space 112b is separated from the central space 112a by the bulkhead 111a, and the airborne bacteria and the like having intruded from the leakage of the mounting frame 113b do not intrude into the central space 112a where work is performed in the aseptic/dustless state. This is the working effect of the prior-art double-wall type isolator device.

Moreover, if the prior-art isolator device F is similarly used as an aseptic isolator, if leakage occurs from the joint portion provided on the bulkhead 111a or from an auxiliary frame 114a provided in an auxiliary opening portion 114a, for example, the air in the unidirectional airflow traveling from the lower part to the upper part in the peripheral space 112b is clean air supplied from the central space 112a, and even if the air leaks to the central space 112a from the leakage of the auxiliary frame 114b, the aseptic/dustless state is not contaminated. This is also the working effect of the prior-art double-wall type isolator device.

On the other hand, consider a case where the prior-art isolator device F is used as a containment isolator. If leakage occurs from the joint portion provided on the front wall portion 110a of the chamber 110 or from the mounting frame 113b provided in the opening portion 113a for work, for example, the air traveling from the lower part to the upper part in the peripheral space 112b is supplied from the central space 112a handling the chemical substances and the like. That is, the air traveling from the lower part to the upper part in the peripheral space 112b contains the chemical substances all the time. As a result, in the case of leakage from the mounting frame 113b, the chemical substances and the like harmful to the human body contaminate the outside environment. Therefore, there is no effect of the double wall but no difference is found from a normal single-wall type isolator device, and high-level safety cannot be ensured.

As described above, the prior-art isolator device F can ensure high-level safety as an aseptic isolator but cannot ensure the high-level safety as a containment isolator.

(Working Effect of Air Outlet)

Subsequently, the working effects of the air outlets 18a to 18d opened in the bottom wall portion 10e of the chamber 10 will be described. In this first embodiment, as described above, the air outlets 18a to 18d are in the bottom wall portion 10e of the chamber 10 and provided in the length direction of the lower end portion closer to the central space 12a than immediately below the lower end portion of each of the bulkheads 11a and 11b.

Figure 4:
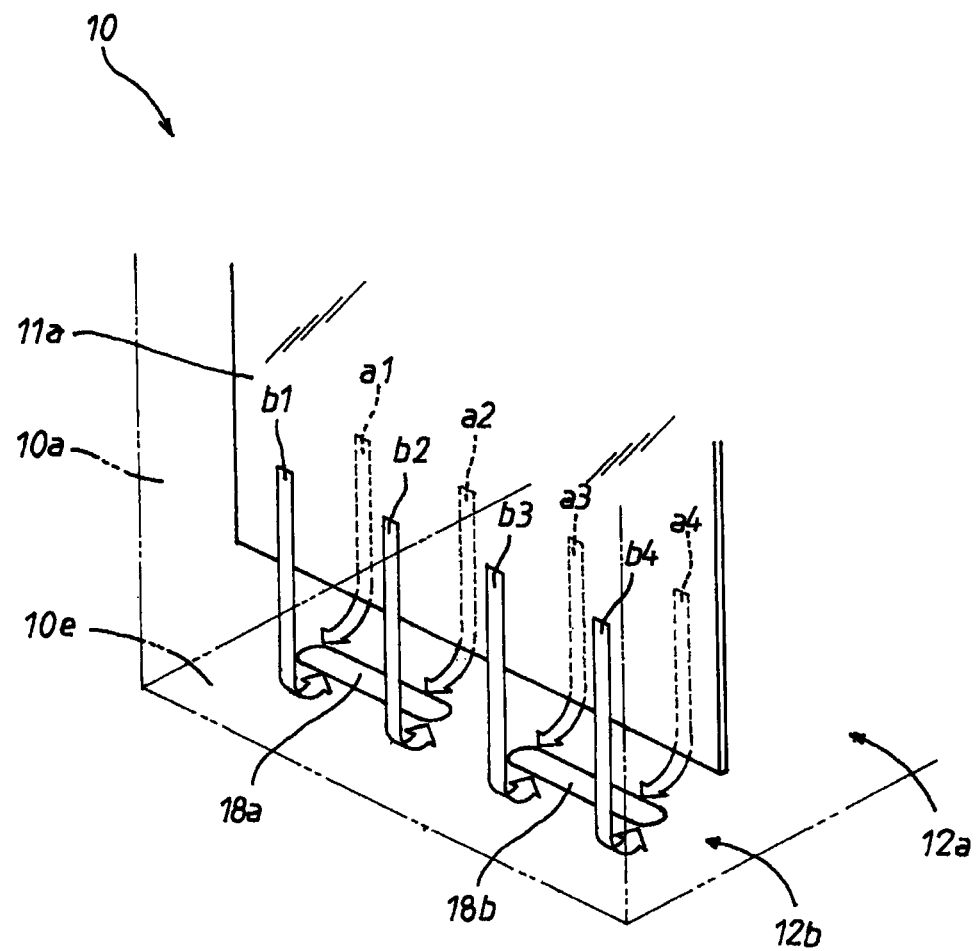
FIG. 4 is an outline diagram illustrating a state where air is sucked to an air outlet of the isolator device illustrated in FIG. 1.

Here, the flow of air sucked into the air outlets 18a to 18d from the chamber 10 will be described in FIG. 4. Air a1 and a2 flowing from the upper part to the lower part on the illustrated rear face side (central space 12a) of the bulkhead 11a is sucked into the air outlet 18a from the illustrated rear face side of the bulkhead 11a, while air b1 and b2 flowing from the upper part to the lower part on the illustrated front side (peripheral space 12b) of the bulkhead 11a is sucked into the air outlet 18a from the illustrated front side of the bulkhead 11a.

Similarly, air a3 and a4 flowing from the upper part to the lower part on the illustrated rear face side (central space 12a) of the bulkhead 11a is sucked to the air outlet 18b from the illustrated rear face side of the bulkhead 11a, while air b3 and b4 flowing from the upper part to the lower part on the illustrated front side (peripheral space 12b) of the bulkhead 11a is sucked to the air outlet 18b from the illustrated front side of the bulkhead 11a.

As described above, each of the air outlets 18a to 18d is provided in the lower part of the lower end portion of each of the bulkheads 11a and 11b, that is, on the downstream side of the air in the unidirectional airflow flowing from the upper part to the lower part longitudinally in the width direction of the lower end portion, and the air in the unidirectional airflow traveling from the upper part to the lower part in the central space 12a and the peripheral spaces 12b and 12c does not change the direction to flow and is sucked into each of the air outlets 18a to 18d without disturbing the laminar state.

Figure 5A:
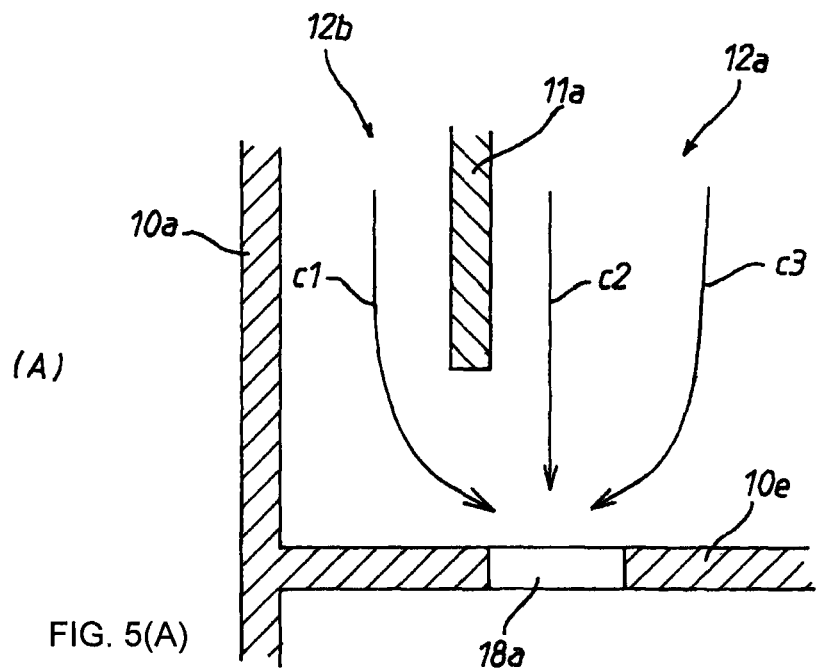
FIG. 5(A) illustrates a case where the air outlet is opened closer to the center of a chamber than immediately below a bulkhead.

Subsequently, the positions of the air outlets 18a to 18d in the bottom wall portion 10e of the chamber 10 will be described. FIG. 5 is an outline diagram illustrating a state where the air in the chamber 10 is sucked into the air outlet 18a when seen from the side face. In FIG. 5(A), the air outlet 18a is opened closer to the central space 12a than immediately below the lower end portion of the bulkhead 11a. In this state, air c1 having flowed from the upper part to the lower part in the peripheral space 12b is sucked into the air outlet 18a without disturbing the laminar state. Similarly, air c2 and c3 having flowed from the upper part to the lower part in the central space 12a is sucked into the air outlet 18a without disturbing the laminar state.

Here, the central space 12a is a space where the work is performed as above and naturally occupies a capacity larger than that of the peripheral space 12b, and a flow rate of the air flowing in the central space 12a is larger than a flow rate of the air flowing in the peripheral space 12b. Thus, if the air outlet 18a is opened closer to the central space 12a than immediately below the lower end portion of the bulkhead 11a, the airflow in the vicinity of the air outlet 18a becomes extremely stable without distributing the laminar state.

Figure 5B:
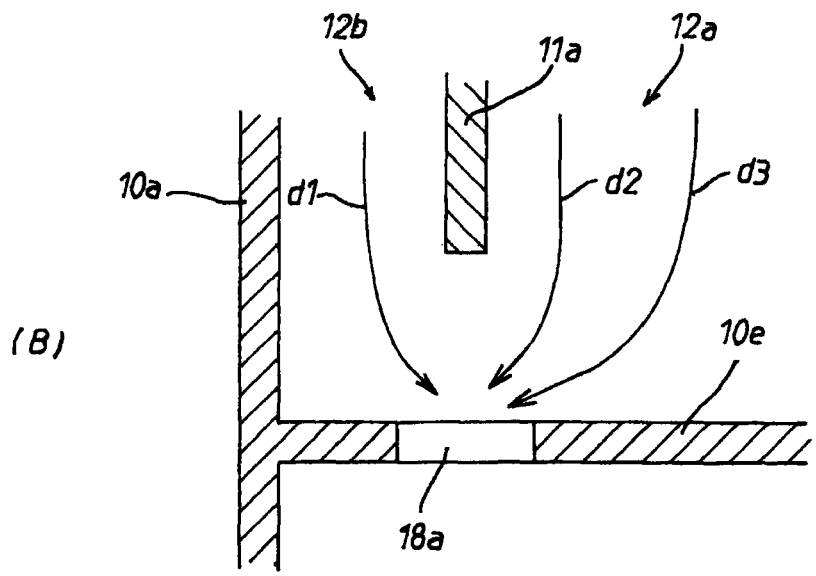
FIG. 5(B) illustrates a case where the air outlet is opened immediately below the bulkhead.

Moreover, in FIG. 5(B), the air outlet 18a is opened immediately below the lower end portion of the bulkhead 11a. In this state, air d1 having flowed from the upper part to the lower part in the peripheral space 12b is sucked into the air outlet 18a without disturbing the laminar state. Similarly, air d2 and d3 having flowed from the upper part to the lower part in the central space 12a is sucked into the air outlet 18a without disturbing the laminar state. As described above, even if the air outlet 18a is opened immediately below the lower end portion of the bulkhead 11a, the airflow in the vicinity of the air outlet 18a becomes stable without disturbing the laminar state.

Figure 6C:
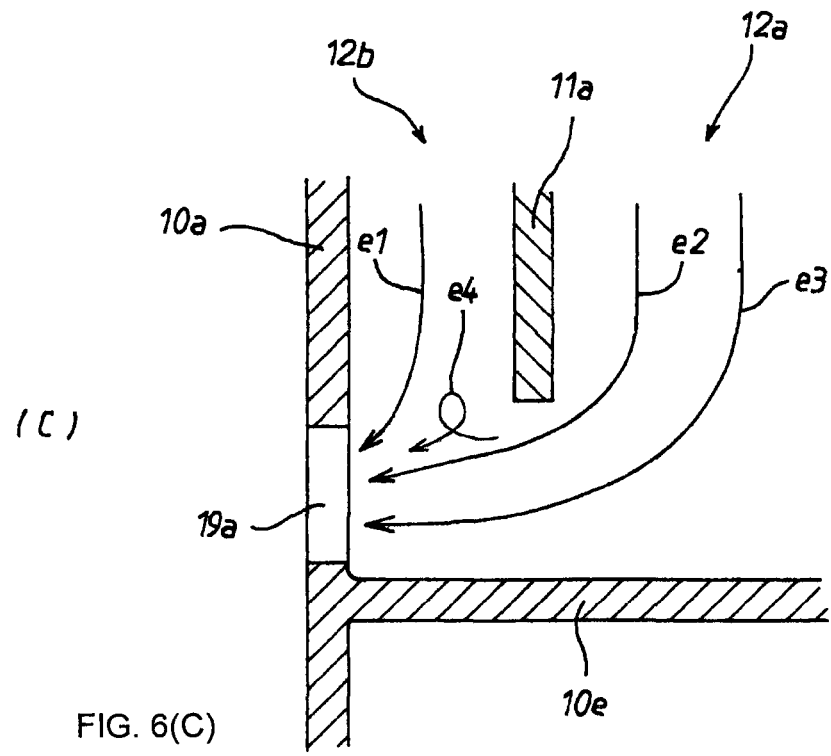
FIG. 6(C) illustrates a case where the air outlet is opened in a lower end portion of a chamber front wall.

On the other hand, in FIG. 6(C), an air outlet 19a is opened in the lower end portion of the front wall portion 10a of the chamber 10. In this state, air e1 having flowed from the upper part to the lower part in the peripheral space 12b and air e2 and e3 having flowed from the upper part to the lower part in the central space 12a are sucked into the air outlet 19a, but since most of the air flowing in the central space 12a passes through the lower end portion of the bulkhead 11a, slight turbulence e4 might be generated in the vicinity of this lower end portion. However, since the air outlet 19a is opened at a low position in the lower end portion of the front wall portion 10a, this turbulence e4 is withdrawn into the air e1 having flowed from the upper part to the lower part in the peripheral space 12b and discharged from the air outlet 19a, which does not particularly cause a problem.

Figure 6D:
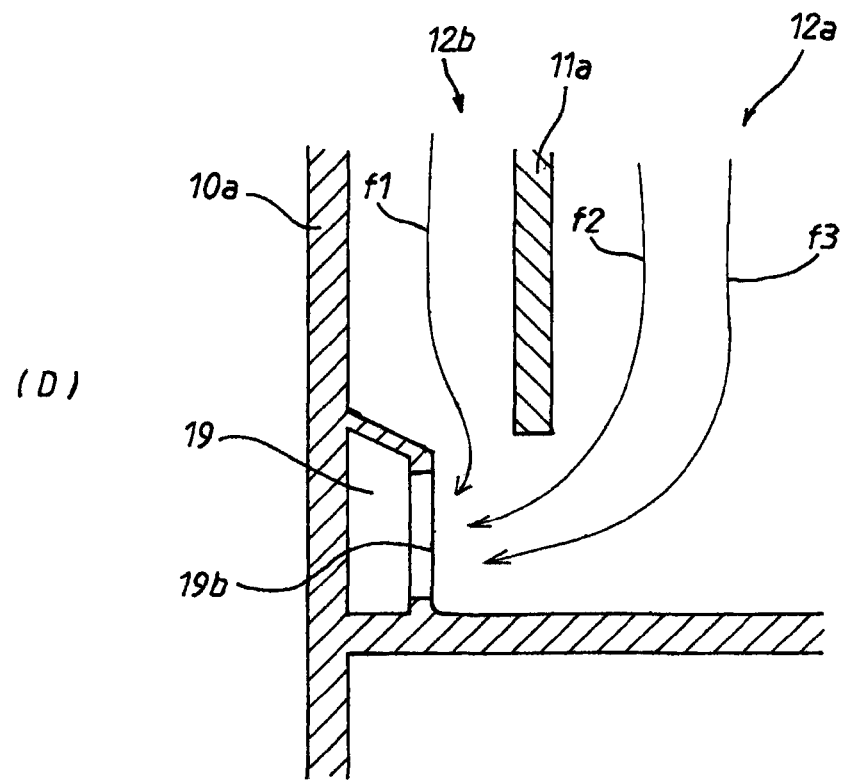
FIG. 6(D) illustrates a case where the air outlet is opened on a side wall of an air discharge duct provided protruding into the chamber from the lower end portion of the chamber front wall.

Moreover, in FIG. 6(D), the air outlet 19b is opened in the side wall of the air discharge duct 19 provided protruding into the chamber from the lower end portion of the front wall portion 10a of the chamber 10. In this state, air f1 having flowed from the upper part to the lower part in the peripheral space 12b and air f2 and f3 having flowed from the upper part to the lower part in the central space 12a is sucked into the air outlet 19b but air f1 flowing in the peripheral space 12b has its channel narrowed by the lower end portion of the bulkhead 11a and the outer wall of the air discharge duct 19, its flow velocity is increased, and the air f1 is considered to be sucked into the air outlet 19b without the airflow in the vicinity of the air outlet 19b being disturbed.

Moreover, according to the configuration of this first embodiment, the bulkheads 11a and 11b are provided on the front wall portion 10a and the rear wall portion 10b of the isolator device A, respectively, and each of the air outlets 18a to 18d is opened in the lower part of the lower end portion of each of the bulkheads 11a and 11b. As a result, the air in the unidirectional airflow traveling from the upper part to the lower part in the central space 12a is discharged separately through the opposing air outlets in two directions (18a and 18b as well as 18c and 18d), respectively. Thus, the air in the central space 12a can flow more stably without disturbing the laminar state.

Moreover, according to the configuration of this first embodiment, each of the air outlets provided in the lower part of the lower end portion of each of the bulkheads 11a and 11b is composed of opening portions two each (18a and 18b as well as 18c and 18d), respectively. However, each of the air outlets is not limited to two opening portions in one bulkhead but may be composed of one opening portion or may be composed by being separated into three or more opening portions. At this time, the total of the opening length in the longitudinal direction of these opening portions is preferably a predetermined length of more.

In this first embodiment, as illustrated in FIG. 2, the total (Y1+Y2) of the opening length (Y1) of the air outlet 18a and the opening length (Y2) of the air outlet 18b in two air outlets provided at the lower part of the lower end portion of the bulkhead 11a is 60% to the width direction length (Z) of the lower end portion of the bulkhead 11a.

On the other hand, in two air outlets provided in the lower part of the lower end portion of the bulkhead 11b, the total (Y3+Y4) of the opening length (Y3) of the air outlet 18c and the opening length (Y4) of the air outlet 18d is 60% to the width direction length (Z) of the lower end portion of the bulkhead 11b.

Here, the total of the opening lengths of the air outlets provided in the lower end portion of each bulkhead is preferably in a ratio of 50 to 100% to the width direction length of the lower end portion of the bulkhead and more preferably in a ratio of 60 to 100%. As a result, the air having flowed along the bulkhead is discharged through the air outlet without largely changing its direction, and the air in the chamber 10 can flow more stably without disturbing the laminar state.

As a result, in this first embodiment, an isolator device, which has a simple structure and can ensure high-level safety in response to risk during operation of the isolator device, can maintain high-level aseptic/dustless state as an aseptic isolator and also prevent leakage of chemical substances, microorganisms and the like to the outside environment at a high level as a containment isolator can be provided.

(Structure and Working Effect of Rectifying Plate)

Figure 7:
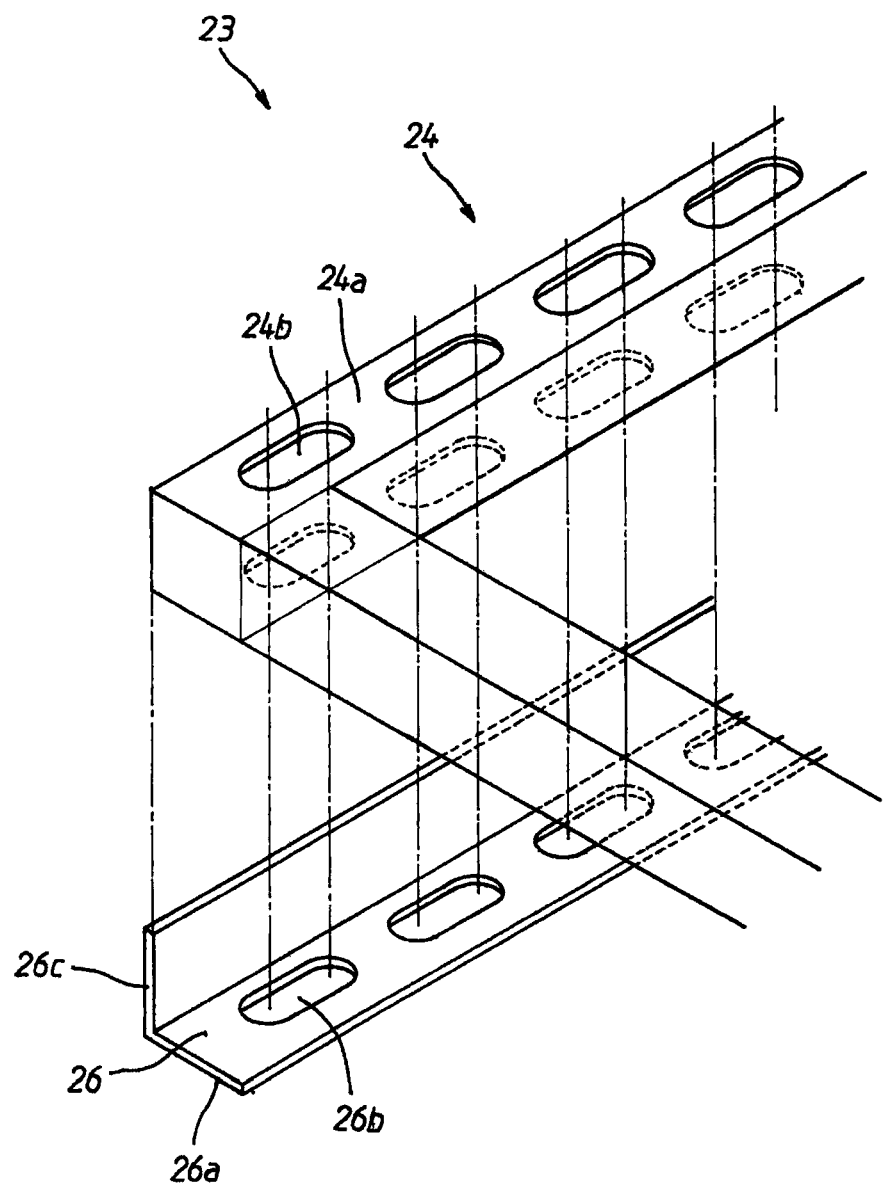
FIG. 7 is an exploded perspective view illustrating a structure of a rectifying plate of the isolator device illustrated in FIG. 1.

Subsequently, the structure and action of the rectifying plate 23 which supplies air in a unidirectional airflow traveling from the upper part to the lower part in the central space 12a and the peripheral spaces 12b and 12c further stable in the isolator device A according to this first embodiment will be described on the basis of FIGS. 7 and 8.

As described above, the rectifying plate 23 is provided below the HEPA filter 22b and over the whole surface on the upper part of the internal space 12 of the chamber 10 (See FIG. 1). This rectifying plate 23 is composed of a rectangular frame body 24 made of stainless metal and membrane screens 25a and 25b attached on the frame body 24 so as to cover the upper face and the bottom face of this frame body 24 (See FIG. 8).

The frame body 24 is assembled into a rectangular shape so that four rectangular pipes 24a cover the peripheral edge portion of a cross sectional shape (See FIG. 2) inside the chamber 10. The rectangular pipes 24a constituting this frame body 24a are provided with a plurality of through ports 24b penetrating from the upper face to the bottom face. Moreover, a receiving member 26 for receiving the bottom face of the frame body 24 and to be constructed on the side wall portions 10a to 10d of the chamber 10 is made of a stainless metal plate having an L-shaped section and is provided with a similar through port 26b at a position opposite to the through port 24b at its bottom piece 26a (See FIG. 7). The actions of these through port 24b and the through port 26b will be described later.

The membrane screens 25a and 25b are woven material made of synthetic fiber long fiber in general and a large number of fine pores having a gap between warps and wefts of the woven material through which the front and the back communicate with each other are formed. As a result, the air passing through the rectifying plate 23 has its flow rectified by a large number of these fine pores and forms the air in the stable unidirectional airflow traveling from the upper part to the lower part in the internal space 12 of the chamber 10.

The synthetic fiber long fiber forming these membrane screens 25a and 25b preferably has a line diameter of 30 to 200 μm and an aperture of 30 to 200 μm. Moreover, the material of the membrane screens 25a and 25b may be anything but in this first embodiment, polyethylene gauze is used.

The rectifying plate 23 configured as above is constructed on the upper part of the chamber 10 together with the receiving member 26 receiving the frame body 24 from its bottom face. First, the receiving member 26 is placed on a small-sized beam 10g (See FIG. 2) partially provided on an upper parts of the peripheral wall portions 10a to 10d of the chamber 10, and its vertical piece 26c is fixed to the peripheral wall portions 10a to 10d by a fitting 26d in an airtight manner. On the L-shaped portion of this receiving member 26, the rectifying plate 23 is placed from above in the airtight manner. At this time, the rectifying plate 23 and the receiving member 26 are fixed so that their through ports 24b and 26b communicate with each other. By means of such structure, washing and replacement of the rectifying plate 23 is made easy.

As described above, consider a case where the rectifying plate 23 is constructed in the upper part of the internal space 12 of the chamber 10 and the clean air is supplied to the internal space 12 by passing through this rectifying plate 23. As illustrated in FIG. 8, a passage state of air is different between a portion where there is no rectangular pipe 24a (hereinafter referred to as a central portion of the rectifying plate 23) and a portion where the rectangular pipe 24a is present (hereinafter referred to as a peripheral edge portion of the rectifying plate 23).

In the peripheral edge portion of the rectifying plate 23, if the through port 24b is not opened in the rectangular pipe 24a, air does not pass this portion. Moreover, below the peripheral edge portion of this rectifying plate 23, the peripheral space 12*b* divided by the bulkhead 11*a* is present. As a result, flow rates of the air are different between the central space 12*a* and the peripheral space 12*b* in the chamber 10. In this case, there might be a difference generated in a state of air flowing through the central space 12*a* and the peripheral space 12*b*, and if the laminar state of the air is disturbed below the chamber 10, it becomes difficult to ensure the high-level safety of the isolator device A.

Figure 8:
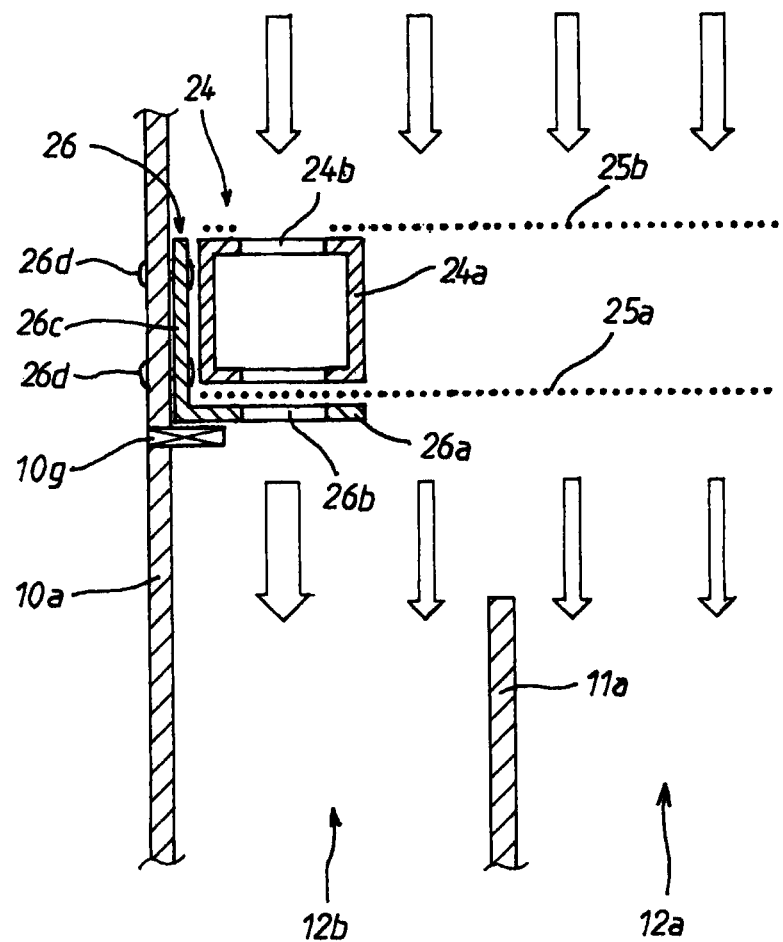
FIG. 8 is a partial sectional view of a mounting portion of the rectifying plate indicated by a circular portion E in FIG. 1 in an enlarged manner.

Thus, in this first embodiment, as described above, the rectangular pipe 24*a* of the frame body 24 and the receiving member 26 are configured to be provided with the through ports 24*b* and 26*b* penetrating from the upper face to the bottom face (See FIG. 8). As a result, since air passes through the portions of the through ports 24*b* and 26*b* penetrating the rectangular pipe 24*a* and the receiving member 26, the air can be also supplied to the lower part of the peripheral edge portion of the rectifying plate 23.

However, an opening rate of the through port 24*b* which can be opened in the rectangular pipe 24*a* in order to maintain the strength of the frame body 24 is limited. Thus, the flow rate of the air from the portions of the through ports 24*b* and 26*b* is increased, and the flow rate (apparent flow rate) of the air from the entire peripheral edge portion of the rectifying plate 23 is brought close to the flow rate of the air from the central portion of the rectifying plate 23. Thus, a different is given in the number of covering membrane screens between the central portion and the peripheral edge portion (portion of the through port) of the rectifying plate 23. That is, the central portion of the rectifying plate 23 is covered by the two membrane screens 25*a* and 25*b* on the upper face and the bottom face, while the peripheral edge portion (portion of the through port) is covered by one membrane screen 25*a* only on the bottom face opening portion (See FIG. 8).

As a result, passage resistance of the air in the portion of the through port of the rectifying plate 23 becomes smaller than the passage resistance of the air in the central portion of the rectifying plate 23, and the flow velocity of the air in the portion of the through port 24*b* becomes larger than the flow velocity of the air in the central portion. As a result, the flow rate of the air in the portion of the through port 24*b* becomes larger than the flow rate of the air in the central portion. Therefore, a difference between the flow rate of the air in the central portion of the rectifying plate 23 and the flow rate (apparent flow rate) of the peripheral edge portion becomes small. As a result, the air passing through the rectifying plate 23 becomes the air in the unidirectional airflow traveling from the upper part to the lower part in the internal space 12 of the chamber 10 from the entire rectifying plate 23 and stably flows, the laminar state in the chamber is further stabilized and high-level safety can be maintained.

Moreover, by adjusting the opening rate of the through port 24*b* to the area of the bottom surface of the rectangular pipe 24*a*, higher-level safety can be ensured. With this method, assuming that a flow velocity of the air passing through the bottom face portion (where the membrane screen has a single layer) of the through port 24*b* covering only the membrane screen 25*a* is V1 and a flow velocity of the air passing through the portion (where the membrane screen has double layer) covering the membrane screen 25*a* and the membrane screen 25*b* is V2, the opening rate X(%) of the through port 24*b* can be acquired by the following expression:

$$X=(V2/V1)\times 100.$$

As a result, when the rectifying plate 23 is to be designed, by measuring the flow velocity of the air in the portion where the membrane screen has a single layer and the flow velocity of the air in the portion where the membrane screen has double layers, the flow rate of the air in the central portion of the rectifying plate 23 and the flow rate (apparent flow rate) of the air in the peripheral edge portion can be adjusted more accurately. As a result, the air passing through the rectifying plate 23 becomes the air in the unidirectional airflow traveling from the upper part to the lower part in the internal space 12 of the chamber 10 from the entire rectifying plate 23 and flows more stably.

<Second Embodiment>

Figure 9:
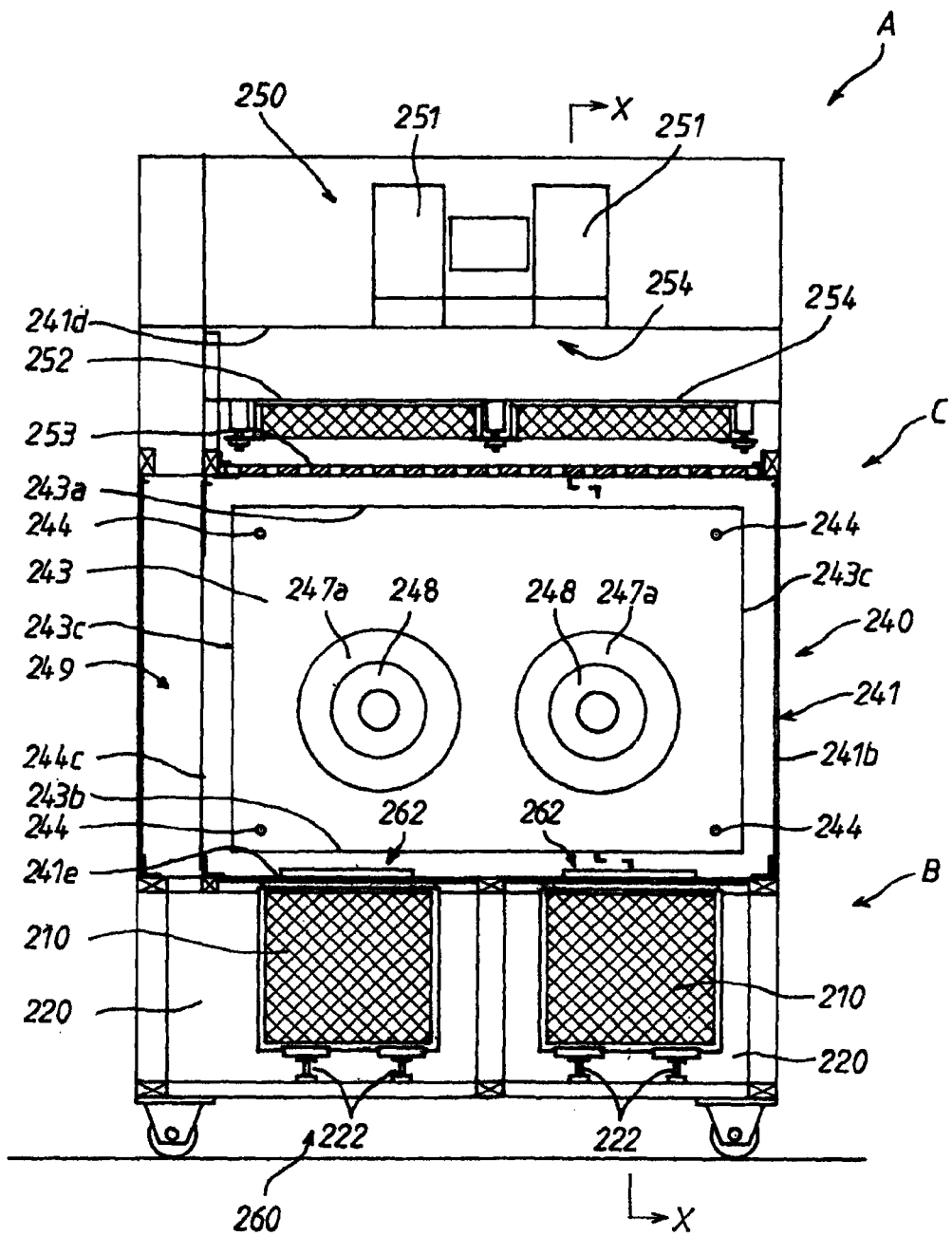
FIG. 9 is a view of an isolator device according to a second embodiment of the present invention when seen from the front and a sectional view along Y-Y line illustrated in FIG. 10.
Figure 10:
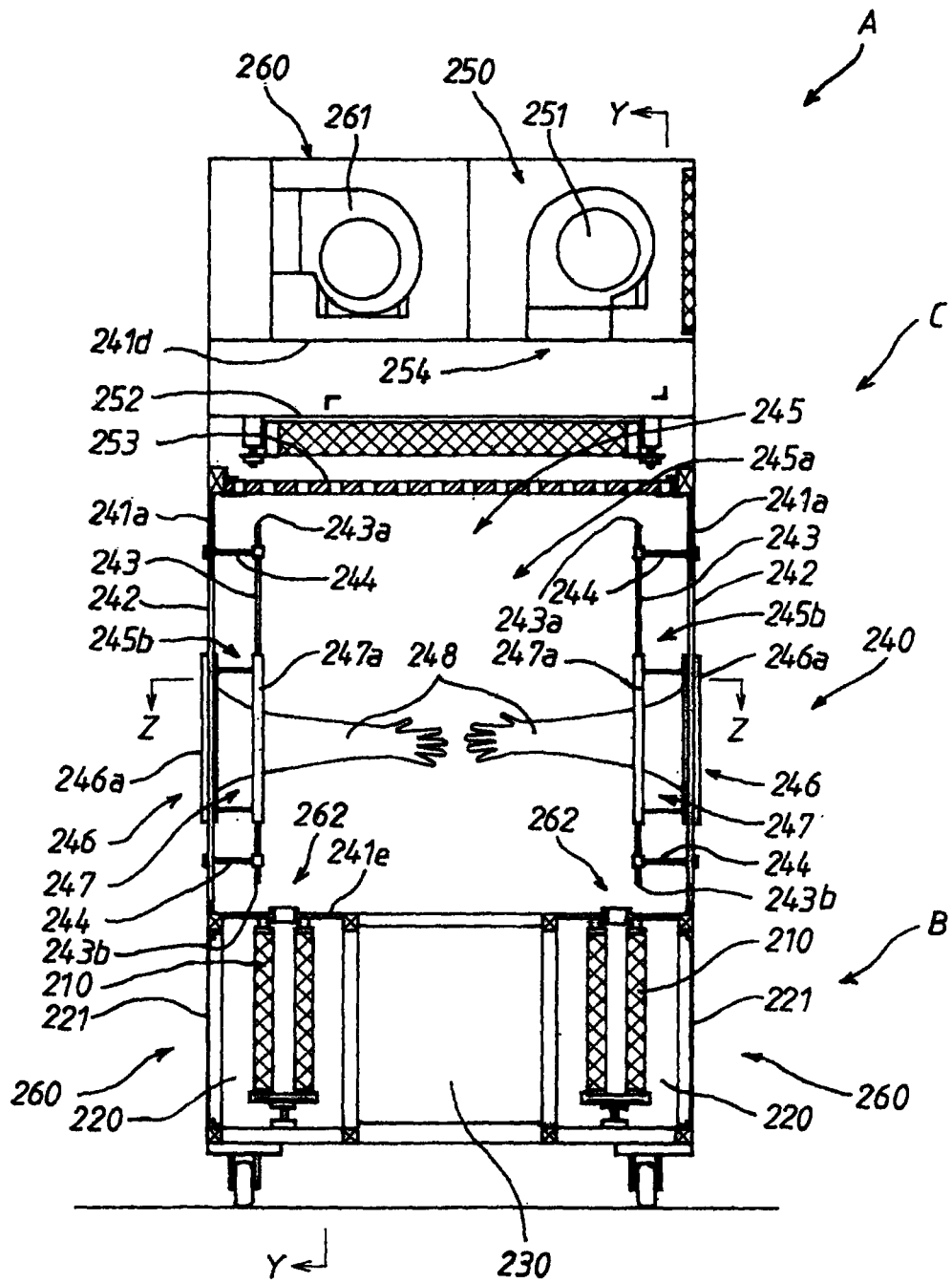
FIG. 10 is a view of the isolator device illustrated in FIG. 9 when seen from a left side face and a sectional view along X-X line illustrated in FIG. 9.
Figure 11:
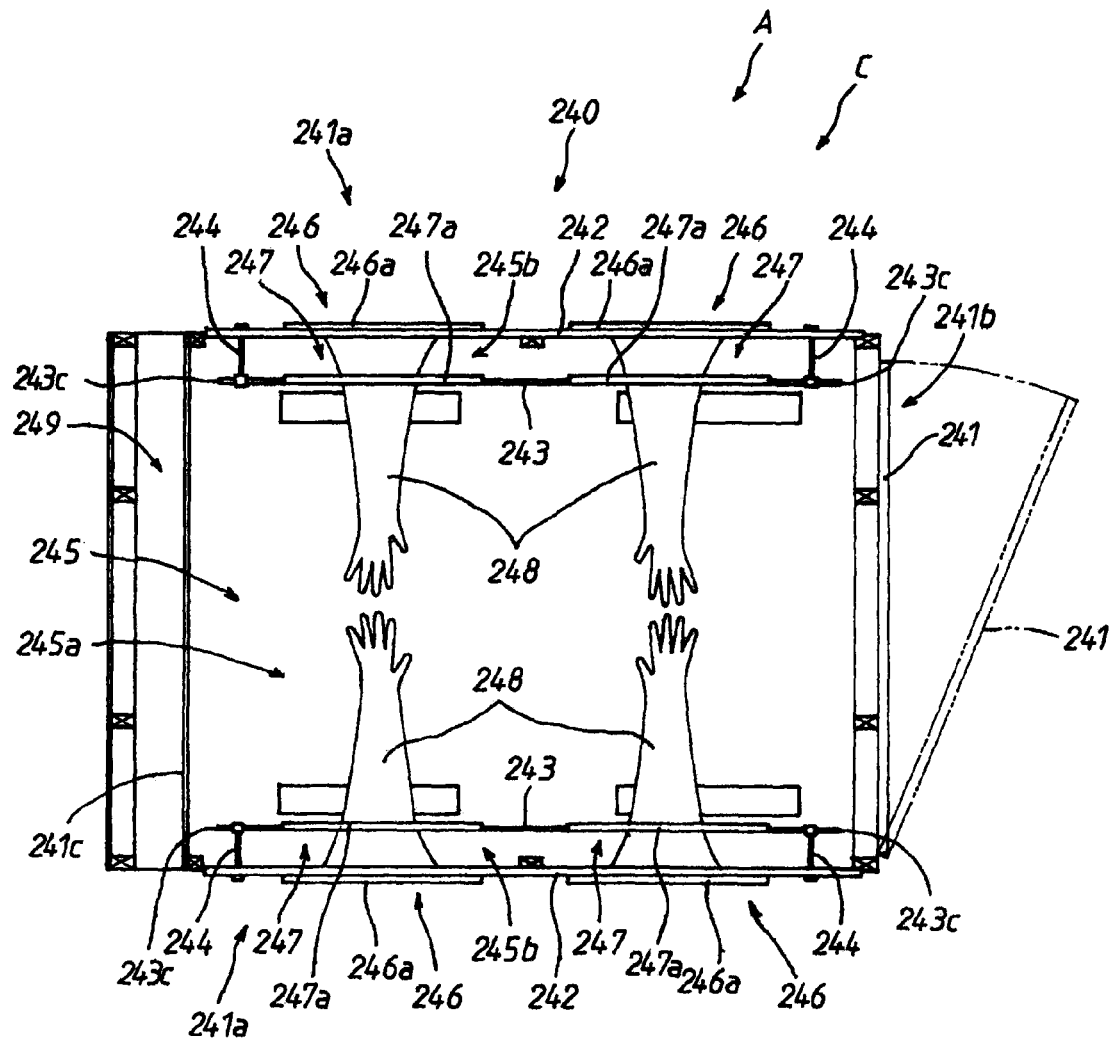
FIG. 11 is a view of the isolator device illustrated in FIG. 9 when seen from a plane and a sectional view along Z-Z line illustrated in FIG. 10.

A second embodiment of the isolator device according to the present invention will be described on the basis of the attached drawings. As illustrated in FIGS. 9 to 11, the isolator device A is composed of the rack B placed on a floor surface and the isolator main body C placed on this rack B.

The rack B has its periphery covered by a wall material made of a stainless metal plate, and four housings 220 to each of which a filter unit 210 for air purification (hereinafter referred to as a filter unit 210) is to be attached, electric components and a machine room 230 are accommodated therein. On the front face and the rear face of this rack B, an opening/closing door 221 for replacing the filter unit 210 from each of the housings 220 is provided in the sealing manner and capable of opening/closing.

In the four housings 220, the two housings 220 accommodated on the front face side of the rack B communicate with each other and the two housings 220 accommodated on the rear face side of the rack B communicate with each other in FIG. 9.

The isolator main body C is provided with the chamber 240, an air feed mechanism 250, and the air discharge mechanism 260.

The chamber 240 is formed of a box body constituted by stainless metal plates and is shielded in an airtight manner from the outside environment where a worker performs a work and this chamber 240 is provided with a spray nozzle for washing liquid for washing the inside and a drain groove (none of them is shown).

Both wall portions 241*a* on the front face and the rear face of the chamber 240 have transparent glass windows 242 through which the inside can be visually checked, respectively. Moreover, in the chamber 240, a glass bulkhead 243 is disposed in parallel with the glass window 242 inside each of the glass windows 242, respectively. Each glass bulkhead 243 is supported by the both wall portions 241*a* on the front face and the rear face by four supporting tools 244 in a state where each of upper, lower, right and left end portions 243*a* to 243*c* is not brought into contact with each of opposing wall faces 241*b* to 241*e* but holds a certain distance from each other. As a result, an internal space 245 of the chamber 240 is divided into a central space 245*a* and two peripheral spaces 245*b* on the front face and the rear face.

Each glass window 242 has opening portions 246 for work of two each through which the outside communicates with the internal space 245 of the chamber 240. Moreover, each glass bulkhead 243 has auxiliary opening portions 247 of two each through which the central space 245*a* and the peripheral space 245*b* communicate with each other at positions opposite to the opening portions 246 for work. In each opening portion 246 for work, a base end portion of a glove 248 made of resin is attached by a mounting frame 246*a* in the airtight manner, respectively, and moreover, these gloves 248 are also attached to each of the auxiliary opening portions 247 by an auxiliary frame 247*a* and have their distal end portion disposed in the central space 245*a*.

In the wall portion 241*b* on the right side face of the chamber 240, an opening/closing door 241 for carrying-in of equipment into the chamber 240 and maintenance of the inside is provided in the sealing manner and capable of being opened/closed (See FIG. 11). Outside a wall portion 241c on the left side face of the chamber 240, a duct 249 communicating with the four housings 220 accommodated in the rack B is provided while being oriented upward along the left side face of the chamber 240 (See FIG. 9).

An air feed mechanism 250 is provided is provided with an air feeding blower 251 for supplying outside air into the chamber 240, an air feeding filter 252 for filtering the air supplied from this air feeding blower 251, and the rectifying plate 253 for rectifying the filtered air and supplying the air into the chamber 240.

The air feeding blower 251 is connected to the outer side of the chamber 240 through an air inlet 254 (not shown) opened in an upper wall portion 241d of the chamber 240. This air feeding blower 251 sucks outside air and the air discharged from this air feeding blower 251 is supplied to the air feeding filter 252.

The air feeding filter 252 is provided on the upper part of the internal space 245 in the chamber 240 and is composed of the HEPA filter for filtering the air supplied from the air feeding blower 251. The air purified by this air feeding filter 252 is supplied to the internal space 245 of the chamber 240 through the rectifying plate 253 located in the lower part of the air feeding filter 252 and provided over the whole surface of the upper part in the chamber 240.

This rectifying plate 253 has a plurality of air passage holes and unifomizes an airflow. As a result, the air supplied from the air feeding filter 252 forms air in a unidirectional airflow (so-called laminar flow) traveling from the upper part to the lower part in the internal space 245 of the chamber 240 through the rectifying plate 253.

The air discharge mechanism 260 is provided with the filter unit 210 for purifying air of the internal space 245 of the chamber 240 and an air discharge blower 261 for discharging the air purified in this filter unit 210 to the outside of the chamber 240 through the housing 220 and the duct 249.

The filter unit 210 is attached in the housing 220 communicating with the chamber 240 through an air outlet 262 opened in the bottom wall portion 241e of the chamber 240. The structure of this filter unit 210 and an attached state in the housing 220 will be described later.

The air discharge blower 261 communicates with the upper part opening portion of the duct 249 and is provided outside the upper wall portion 241d of the chamber 240 and on the rear face side of the air feeding blower 251. This air discharge blower 261 discharges the air fed through the housing 220 and the duct 249 to the outside of the chamber 240.

(Embodiment 2A of Filter Unit for Air Purification)

Figure 12:
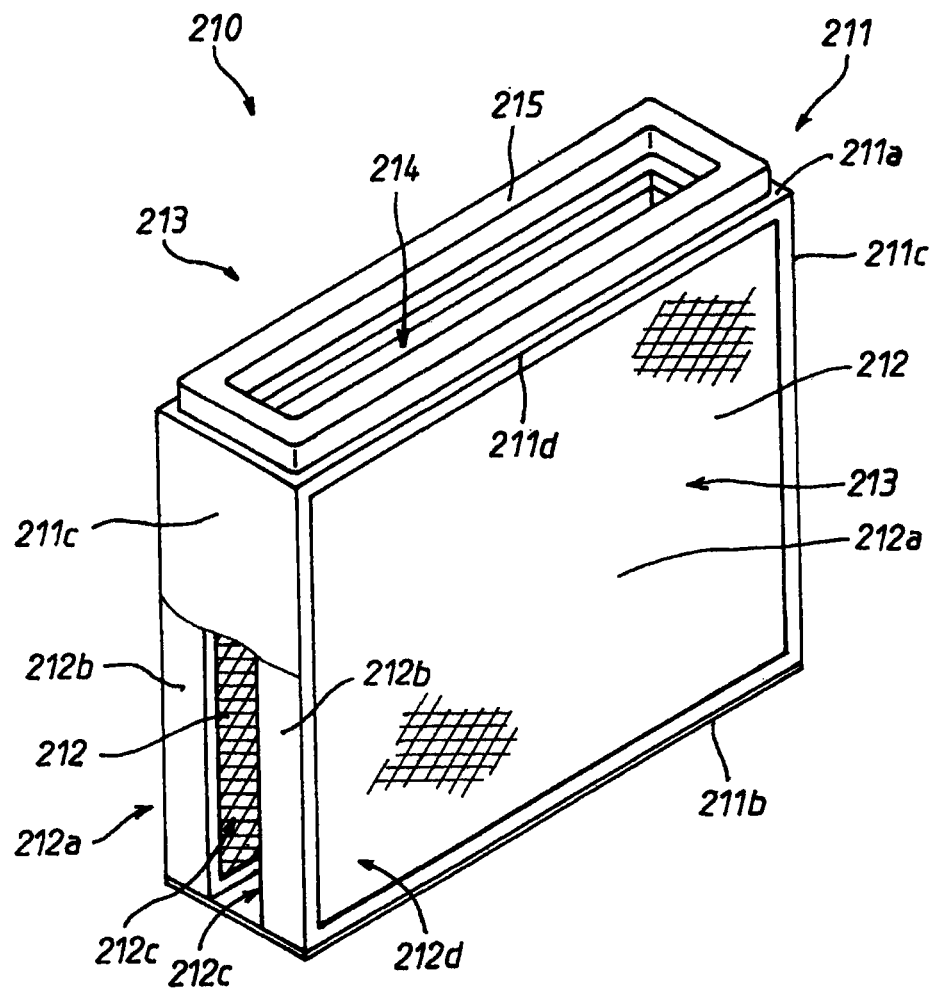
FIG. 12 is a perspective view illustrating an embodiment 2A of a filter unit for air purification incorporated in the isolator device illustrated in FIG. 9.

Here, the structure of the filter unit 210 will be described. In FIG. 12, the filter unit 210 is a rectangular cylindrical body having a hollow part therein and is provided with the cylindrical body 211 made of a stainless metal plate and two HEPA filters 212.

The cylindrical body 211 is composed of a top plate 211a, a bottom plate 211b, and two lateral plates 211c, and a front face and a rear face are left open as the air discharge port portion 213 having a rectangular shape. In the top plate 211a, the air inlet portion 214 opened in a longitudinally state along a boundary line 211d where the face of the air discharge port portion 213 and the top plate 211a cross each other is provided.

Each of the two HEPA filters 212 is composed of a filter 212a formed by bending a filtering material made of a glass fiber in a wavy shape and a rectangular outer frame 212b holding the peripheral edge portion of this filter 212a. The two HEPA filters 212 are fixed to an inner edge portion of the cylindrical body 211 by an outer edge portion of the outer frame 212b so as to cover the air discharge port portions 213, respectively.

As a result, the two HEPA filters 212 are aligned in parallel so as to oppose each other with the respective air intake surfaces 212c oriented to the inside of the filter unit 210. On the other hand, the two HEPA filters 212 have their air discharge surfaces 212d oriented to the outside of the filter unit 210, and these air discharge surfaces 212d constitute an outer wall surface of the front face and the rear face of the filter unit 210.

Moreover, the filter unit 210 is provided with a packing 215 made of rubber as an annular seal member so as to surround the air inlet portion 214 opened above the top plate 211a.

Figure 13:
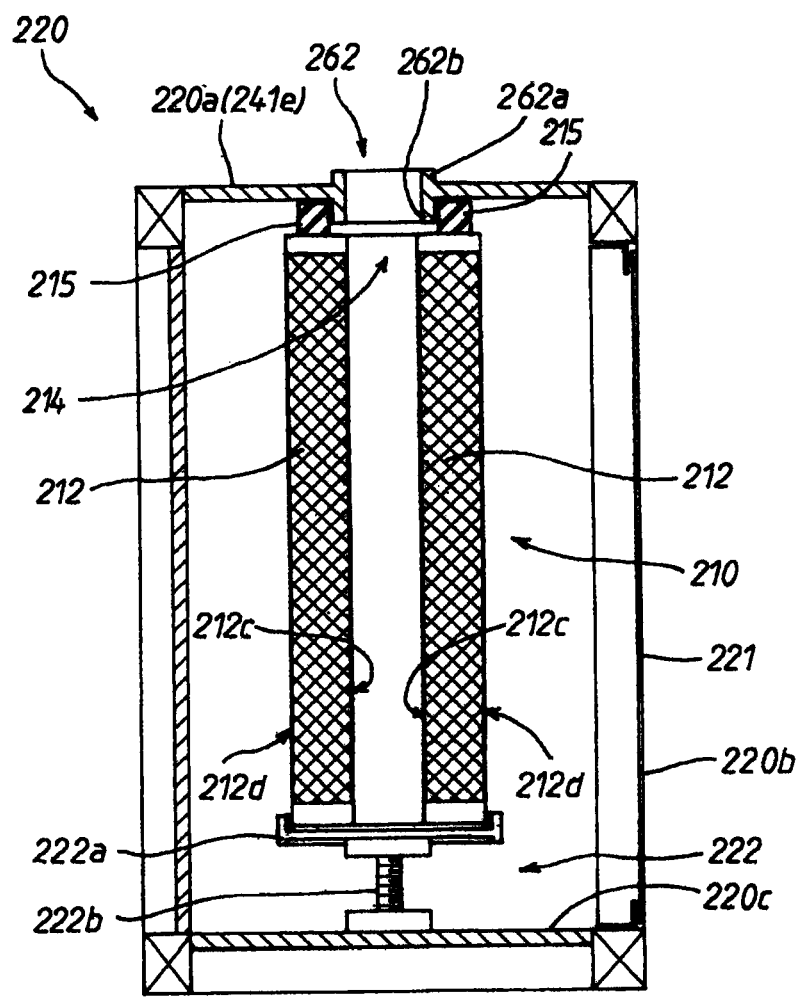
FIG. 13 is a sectional view of the filter unit for air purification illustrated in FIG. 12 illustrating a state attached to a housing when seen from the side face.

Subsequently, a state where the filter unit 210 configured as above is attached in the housing 220 will be described. FIG. 13 is a sectional view of the filter unit 210 to which the housing 220 is attached when seen from the side face.

In FIG. 13, the housing 220 is formed of a box body composed of stainless metal plates and is accommodated in the rack B as described above. An upper wall portion 220a of the housing 220 is a wall portion in common with the bottom wall portion 241e of the chamber 240, and in a wall portion 220b on the front face of the housing 220, the opening/closing door 221 for replacement of the filter unit 210 from the housing 220 is provided in the sealing manner and capable of opening/closing as described above.

The housing 220 communicates with the adjacent housing 220 as described above and at the same time, communicates with the duct 249 so as to constitute an air discharge channel from the air outlet 262 opened in the bottom wall portion 241e (corresponding to an upper wall portion 220a of the housing 220) of the chamber 240 to the air discharging blower 261 (See FIG. 9).

In the peripheral wall portion of the air outlet 262 opened in the upper wall portion 220a of the housing 220, an annular upper extending portion 262a extending to the chamber 240 side (upper side) over the entire periphery of the peripheral edge portion and an annular lower extending portion 262b extending to the housing 220 side (lower side) over the entire periphery of the peripheral edge portion are formed.

In the bottom wall portion 220c of the housing 220, two unit pressing tools 222 disposed in a lower part of the air outlet 262 and pressing the filter unit 210 to the air outlet 262 are provided (See FIGS. 9 and 13). This unit pressing tool 222 is composed of a receiving member 222a for receiving the lower end portion of the filter unit 210 and a movable member 222b for vertically moving this receiving member 222a in a screw method.

In the housing 220 configured as above, the filter unit 210 is attached so that the air inlet portion 214 is opposed to the air outlet 262 and the packing 215 is brought into contact with the upper wall portion 220a of the housing 220 along the outer peripheral portion of the lower extending portion 262b. At this time, the lower end portion of the filter unit 210 is received by the receiving member 222a and pressed upward by the movable member 222b, and the filter unit 210 is attached to the air outlet 262 by the packing 215 through the air inlet portion 214 in the sealing manner.

Here, in the isolator device A according to this second embodiment configured as above, the airflow during operation will be described.

In FIG. 10, when the air feeding blower 251 and the air discharge blower 261 are operated, the air discharged from the air feeding blower 251 is supplied to the air feeding filter 252. The air purified by this air feeding filter 252 forms air in a unidirectional airflow traveling from the upper part to the lower part in the internal space 245 of the chamber 240 through the rectifying plate 253.

In other words, most of the purified air to be supplied downward through the rectifying plate 253 passes through the central space 245a in the internal space 245 of the chamber 240 and forms the air in the unidirectional airflow traveling from the upper part to the lower part. As a result, the chemicals and the like used in the work in the central space 245a are discharged through the air outlet 262 along the unidirectional airflow passing through the central space 245a and traveling from the upper part to the lower part.

On the other hand, the other part of the purified air to be supplied downward through the rectifying plate 253 passes through the peripheral space 245b in the internal space 245 of the chamber 240 and forms air in a unidirectional airflow traveling from the upper part to the lower part. This peripheral space 245b is separated from the central space 245a by the glass bulkhead 243, and a work using chemicals and the like is not directly performed therein. Thus, purified air flows in the peripheral space 245b. As a result, even in the case of leakage in the mounting frame 246a of the gloves 248 or the like, the chemicals and the like in the central space 245a do not leak to the outside of the chamber 240.

As described above, each air in the unidirectional airflow having flowed through the central space 245a and the peripheral space 245b is discharged to the outside of the chamber 240 by means of sucking of the air discharge blower 261 through the four air outlets 262 (See FIG. 11) provided in the chamber 240.

The air discharged to the outside of the chamber 240 through the air outlet 262 contains the chemicals and the like used in the work in the central space 245a. As illustrated in FIGS. 10 and 13, the air discharged through the air outlet 262 is introduced into the space in the filter unit 210 from the air inlet portion 214 of the filter unit 210 attached to the air outlet 262 in the sealing manner. The air introduced into the filter unit 210 is sucked from the air intake surfaces 212c of the two HEPA filters 212 and purified by these HEPA filters 212 and then, discharged into the housing 220 from the air discharge surfaces 212d of the two HEPA filters 212.

The purified air discharged from the air discharge surface 212d of the filter unit 210 passes through the duct 249 from inside of the housing 220 and is discharged to the outside of the chamber 240 by means of sucking of the air discharge blower 261 (See FIG. 9).

The filter unit 210 having been used as above has many chemicals adhering to the space inside thereof and the air intake surface 212c of the HEPA filter 212. Thus, the work of removing the used filter unit 210 from the housing 220 will be described.

First, the air feeding blower 251 and the air discharge blower 261 are stopped, and the inside of the chamber 240 is washed by using the spray nozzle for washing liquid (not shown). Moreover, the periphery of the air outlet 262 is washed, and wet-down of moistening the air intake surface 212c of the HEPA filter 212 inside the filter unit 210 is performed. By means of this wet-down, the chemical substances and the like adhering in a large quantity to the air intake surface 212c of the HEPA filter 212 can be prevented from flying apart.

Figure 14:
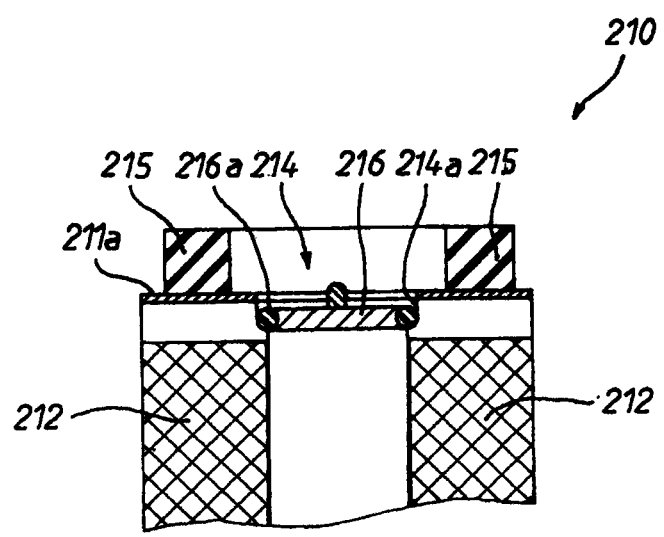
FIG. 14 is a partial sectional view illustrating a state where a lid body is attached to the filter unit for air purification illustrated in FIG. 13.

Subsequently, the lid body 216 is attached to the air inlet portion 214 of the filter unit 210 from inside the chamber 240 (See FIG. 14). This lid body 216 is provided with the packing 216a made of rubber surrounding the entire periphery of the outer peripheral edge thereof. This lid body 216 is attached to a mounting groove 214a provided in the air inlet portion 214 by the packing 216a in the sealing manner. As a result, the inside of the filter unit 210 contaminated by the chemical substances and the like is sealed, and the chemical substances and the like inside do not leak to the outside environment.

As described above, in a state where the inside of the filter unit 210 is sealed, the opening/closing door 221 of the housing 220 is opened, the screw of the movable member 222b pressing the filter unit 210 upward is loosened, and the receiving member 222a is pushed downward so as to remove the filter unit 210 from the air outlet 262.

In the embodiment 2A of the filter unit incorporated in the isolator device A according to this second embodiment configured as above, the cylindrical body and the two HEPA filters integrally constitute the filter unit. The air discharge surfaces of these two HEPA filters both constitute the outer wall face of the air discharge port portion. On the other hand, the air intake surfaces of the two HEPA filters are both accommodated inside the cylindrical body. As described above, the filter unit according to this embodiment 2A has a simple structure and the whole filter unit is attached to the housing provided communicating with the air outlet of the chamber of the isolator device handling the chemical substances and the like harmful to the human body.

In the filter unit, the air containing the chemical substances and the like discharged from the air outlet of the chamber is guided into the filter unit through the air inlet portion. The air guided into the filter unit is sucked from the air intake surfaces of the two HEPA filters and filtered and discharged to the outside of the filter unit from the air discharge surfaces of these two HEPA filters. As a result, the chemical substances and the like contained in the air filtered by the two HEPA filters adhere to the air intake surfaces of these two HEPA filters and are trapped inside the filter unit.

Subsequently, when the filter unit is to be replaced, the inside of the filter unit can be easily sealed by closing the air inlet portion by the lid body. As a result, leakage of the chemical substances and the like trapped inside the filter unit to the outside environment can be prevented. Therefore, by replacing the whole filter unit, the filter replacement work can be performed easily, and the risk of contaminating the outside environment by this replacement work can be kept low.

Moreover, the embodiment 2A of the filter unit incorporated in the isolator device A according to this second embodiment has, as described above, a simple structure composed of the cylindrical body and the two HEPA filters. Therefore, this filter unit has a low manufacturing cost and a low disposal cost when the whole filter unit is to be disposed of. Thus, the maintenance cost of the isolator device including the manufacturing cost and the disposal cost can be kept low.

Moreover, according to the embodiment 2A of the filter unit incorporated in the isolator device A according to this second embodiment, since the air inlet portion is longitudinally opened, the shape of the top plate in which this air inlet portion is opened can be made to have a longitudinally rectangular shape so as to increase the length of the long side, while the short side thereof can be kept short. With the two boundaries on the long side sides of this top plate, the air discharge surfaces of the HEPA filters are crossed, respectively. Therefore, the length of the long side of the top plate determines the size of the air discharge surface of the HEPA filter. On the other hand, the short sides of the top plate are in a direction crossing the air discharge surfaces of the two HEPA filters, and the length of this short side determines the depth of the filter unit. Thus, by forming the top plate having a longitudinally rectangular shape so as to increase the length of the long side and to reduce the length of the short side, the area of the air discharge surface of the filter unit can be increased, while the depth can be made smaller.

As a result, the shape of the filter unit becomes compact, and the area of the air discharge surface can be increased with respect to this compact shape. Therefore, when the filter unit is to be attached to the air discharge path of the air discharged from the chamber, restriction on a place is reduced, and freedom in designing the isolator device is improved. As a result, in this embodiment 2A, a housing can be provided in the lower part of the chamber, and four housings can be accommodated in the rack of the isolator device.

Moreover, according to this embodiment 2A, the filter unit is provided with the two HEPA filters. Since two pieces of the HEPA filters are used, the ventilation area of the filter unit can be taken wider as described above, and the filtering efficiency is improved. Thus, the filter capacity required for the filter unit is reduced, and a compact filter unit can be provided.

Moreover, as described above, the air discharge surfaces of the two HEPA filters constitute the outer wall face of the air discharge port portion. The air discharge surfaces of the HEPA filters form a plane and can be subjected to the scan test similar to the leak test of a usual HEPA filter and the like. As a result, in the leak test of the filter unit itself, the scan test can be conducted directly for the two air discharge surfaces, and the check of completeness of the filter unit can be performed with the prior-art method.

On the other hand, in the isolator device according to this second embodiment provided with the above-described filter unit, the air in the unidirectional airflow traveling from the upper part to the lower part in the chamber is supplied by the air feed mechanism. Moreover, inside this chamber, the bulkhead is provided in the direction along the unidirectional airflow is provided. This bulkhead is formed in parallel with the peripheral wall portion and divides the internal space of the chamber to the central space and the peripheral space. Therefore, the air of the unidirectional airflow traveling from the upper part to the lower part in the chamber is divided into air of a unidirectional airflow traveling from the upper part to the lower part in the central space and air of a unidirectional airflow traveling from the upper part to the lower part in the peripheral space.

Moreover, the chemical substances and the like handled in the chamber are handled in the central space and are guided to the air outlet by the air of the unidirectional airflow flowing in this central space. On the other hand, since the chemical substances and the like are not handled in the peripheral space, clean air in a unidirectional airflow flows all the time in this peripheral space. Therefore, even if the air in the chamber leaks to the outside environment for some reason, the chemical substances and the like handled in the chamber do not leak to the outside environment due to presence of this peripheral space.

Moreover, the air outlet provided in the bottom wall portion of the chamber is opened longitudinally in the width direction of the lower end portion of the bulkhead. Therefore, air of the respective unidirectional airflows flowing from the upper part to the lower part in the central space and the peripheral space is discharged through this air outlet without being disturbed. In purifying the air discharged from the chamber with high-level safety configured as above, higher-level safety can be ensured by employing the above-described filter unit.

Moreover, in the prior-art isolator device, a plurality of filters are employed for the air discharge path in order to reduce risk in filter replacement. However, in the replacement work of the above-described filter unit, leakage of the filtered chemical substances and the like is prevented at a high level. Therefore, in the isolator device according to this second embodiment, risk in the filter replacement can be reduced by employing the one filter unit. This means that it is only necessary to replace one filter unit and that is advantageous in designing of an isolator device and a maintenance cost thereof.

(Embodiment 2B of Filter Unit for Air Purification)

Figure 15:
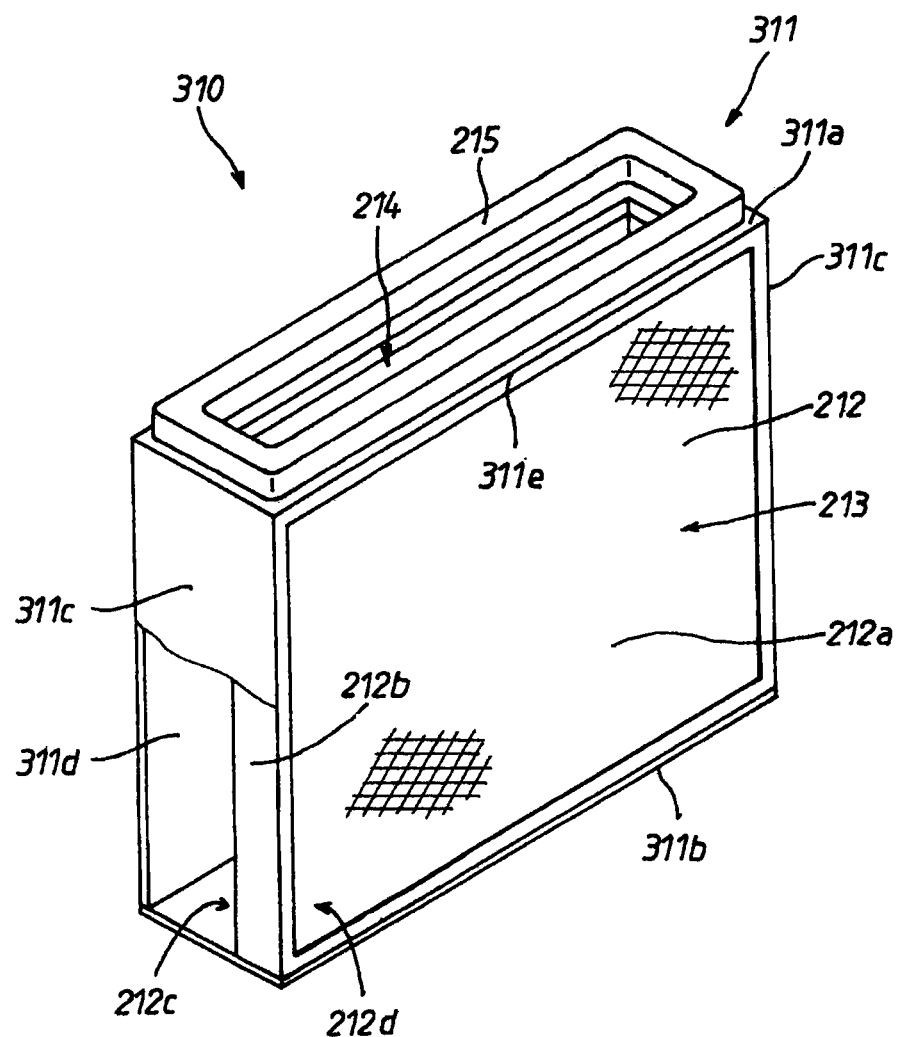
FIG. 15 is a perspective view illustrating another embodiment 2B of the filter unit for air purification incorporated in the isolator device illustrated in FIG. 9.

Subsequently, an embodiment 2B of a filter unit according to the present invention will be described. As illustrated in FIG. 15, a filter unit 310 is a rectangular cylindrical body having a hollow part therein and is provided with a cylindrical body 311 made of a stainless metal plate and one HEPA filter 212.

The cylindrical body 311 is composed of a top plate 311a, a bottom plate 311b, two lateral plates 311c, and a rear plate 311d and the front face is left open as the air discharge port portion 213 having a rectangular shape. In the top plate 311a, the air inlet portion 214 opened in a longitudinally state along a boundary line 311e where the face of the air discharge port portion 213 and the top plate 311a cross each other is provided.

The HEPA filters 212 have the same configuration as in the embodiment 2A. This HEPA filter 212 is fixed to an inner edge portion of the cylindrical body 311 at an outer edge portion of the outer frame 212b so as to cover the air discharge port portion 213.

As a result, the HEPA filters 212 are aligned in parallel so as to oppose the rear plate 311d with the air intake surface 212c oriented to the inside of the filter unit 310. On the other hand, the HEPA filters 212 have the air discharge surfaces 212d oriented to the outside of the filter unit 310 and constitute the outer wall portion of the front face of the filter unit 310 by the air discharge surfaces 212d.

Moreover, the filter unit 310 is provided with the packing 215 made of rubber as an annular seal member so as to surround the air inlet portion 214 opened above the top plate 311a.

The state where the filter unit 310 configured as above is attached in the housing 220 is similar to that in the embodiment 2A.

The filter unit according to this embodiment 2B configured as above is different from the filter unit according to the embodiment 2A provided with the two HEPA filters in a point that only one HEPA filter is provided. This means that the air discharge area of the filter unit decreases and the capacity of the air to be treated is reduced. However, there is no difference from the filter unit according to the embodiment 2A except this point.

Therefore, the filter unit according to this embodiment 2B is effective if the capacity of the air to be treated is small, for the convenience of the isolator device design or if a more compact and more inexpensive filter unit is required. Moreover, since there is only one air discharge surface of the HEPA filter, the scan test in the leak test becomes easier.

(Embodiment 2C of Filter Unit for Air Purification)

Subsequently, an embodiment 2C of a filter unit according to the present invention will be described. A filter unit 410 has a configuration similar to that of the filter unit 210 according to the above-described embodiment 2A. However, instead of the packing 215, a liquid seal 415 is provided (See FIG. 16). This liquid seal 415 is composed of a seal projecting portion 415a and a seal recess portion 415b and a seal agent 415c filled between them.

Figure 16:
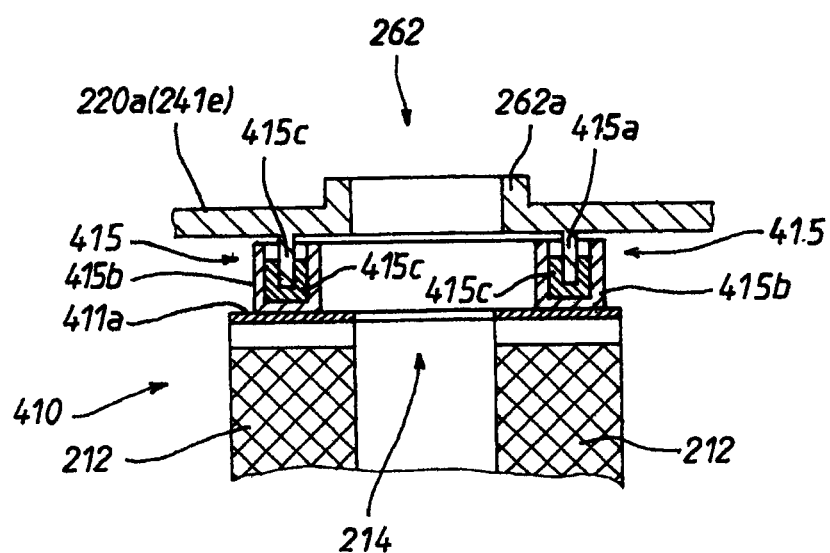
FIG. 16 is a partial sectional view of a portion of a liquid seal in another embodiment 2C of the filter unit for air purification incorporated in the isolator device illustrated in FIG. 9 when seen from the side face.

FIG. 16 illustrates a state where the filter unit 410 is attached having the air inlet portion 214 matched with the position corresponding to the air outlet 262 opened in the upper wall portion 220a of the housing 220. On the peripheral edge portion of the air outlet 262, the upper extending portion 262a extending to the chamber 240 side (upper side) over the entire periphery of the peripheral edge portion is formed. On the other hand, there is no lower extending portion 262b provided in the above-described embodiment 2A, but an annular seal projecting portion 415a extending to the housing 220 side (lower side) so as to surround the air outlet 262 is formed at a position away on the outside from the peripheral edge portion of the air outlet 262 instead.

Moreover, the filter unit 410 is provided with the annular seal recess portion 415b having a recessed section so as to surround the air inlet portion 214 opened above the top plate 411a. In a groove of this seal recess portion 415b, the seal agent 415c such as liquid silicon is filled.

The filter unit 410 configured as above is, as illustrated in FIG. 16, lifted by a unit pressing tool 222 (not shown) so that the seal projecting portion 415c is inserted into the annular groove of the seal recess portion 415b by having the air inlet portion 214 opposed to the air outlet 262 in the housing 220.

At this time, since the seal projecting portion 415a is immersed in the seal agent 415c filled in the groove of the seal recess portion 415b over the entire periphery, the air outlet 262 and the air inlet portion 414 communicate with each other in a sealing manner. As a result, the air introduced into the filter unit 410 through the air outlet 262 is guided into the filter unit 410, and the chemical substances and the like are removed by the HEPA filter 212.

The filter unit according to this embodiment 2C configured as above is different from the filter units in the above-described embodiment 2A and embodiment 2B using the packing in a point that it uses the liquid seal as a seal member for having the air inlet portion and the air outlet of the chamber communicate with each other in the sealing manner. However, there is no difference from the filter units according to the above-described embodiment 2A and embodiment 2B except that point.

(Embodiment 2D of Filter Unit for Air Purification)

Subsequently, an embodiment 2D of a filter unit according to the present invention will be described. A filter unit 510 has a configuration similar to that of the filter unit 210 according to the above-described embodiment 2A. However, instead of the lid body 216 to be attached to the air inlet portion 214 of the filter unit 210, a flexible rubber sheet 516 is provided so as to close the air inlet portion 214 (See FIG. 17).

Figure 17:
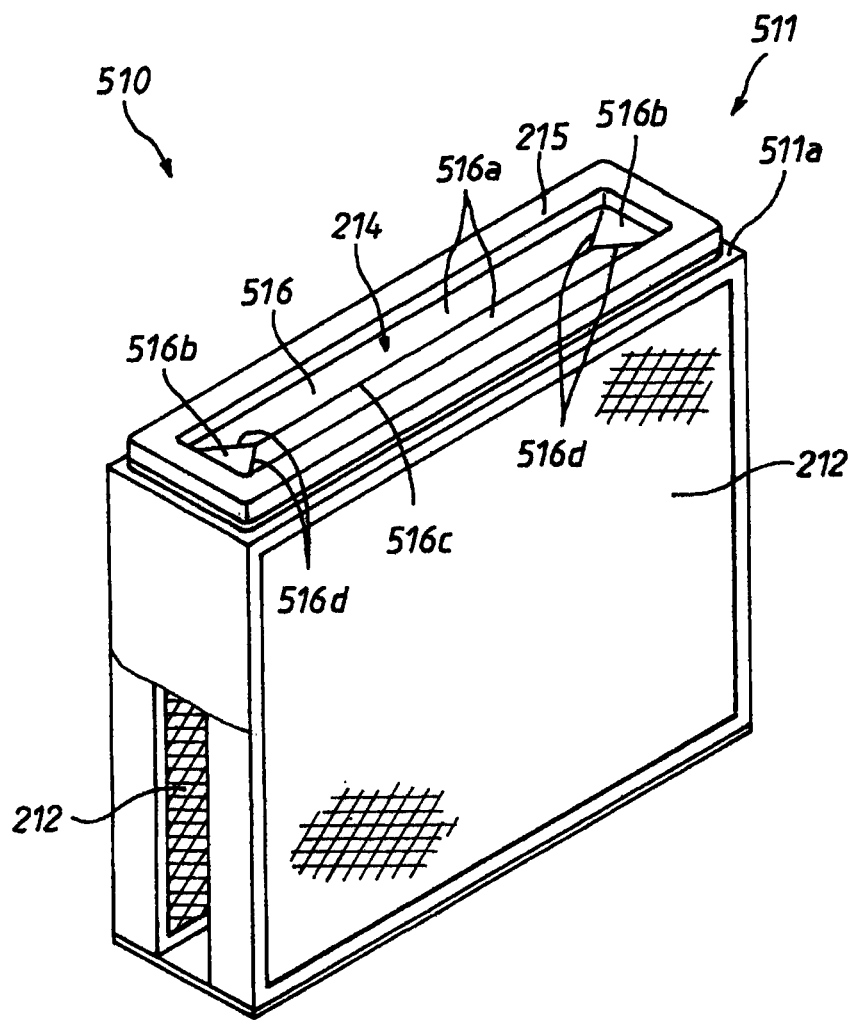
FIG. 17 is a perspective view illustrating another embodiment 2D of the filter unit for air purification incorporated in the isolator device illustrated in FIG. 9.

The rubber sheet 516 is, as illustrated in FIG. 17, composed of two pieces of substantially trapezoidal rubber sheets 516a and two pieces of substantially triangular rubber sheets 516b and is fixed and integrated in a state sandwiched by a top plate 511a of the filter unit 510 and the packing 215 made of rubber. In this fixed state, one slit 516c in the longitudinal direction of the air inlet portion 214 and four slits 516d extending from both end portions of this slit to the peripheral edge portion are formed in the center part of the rubber sheet 516.

Here, as rubber used for the flexible rubber sheet 516, any article can be used as long as it has flexibility. In this embodiment 2D, a sheet of silicon rubber having a thickness of 3 mm was used for the rubber sheet 516.

Figure 18:
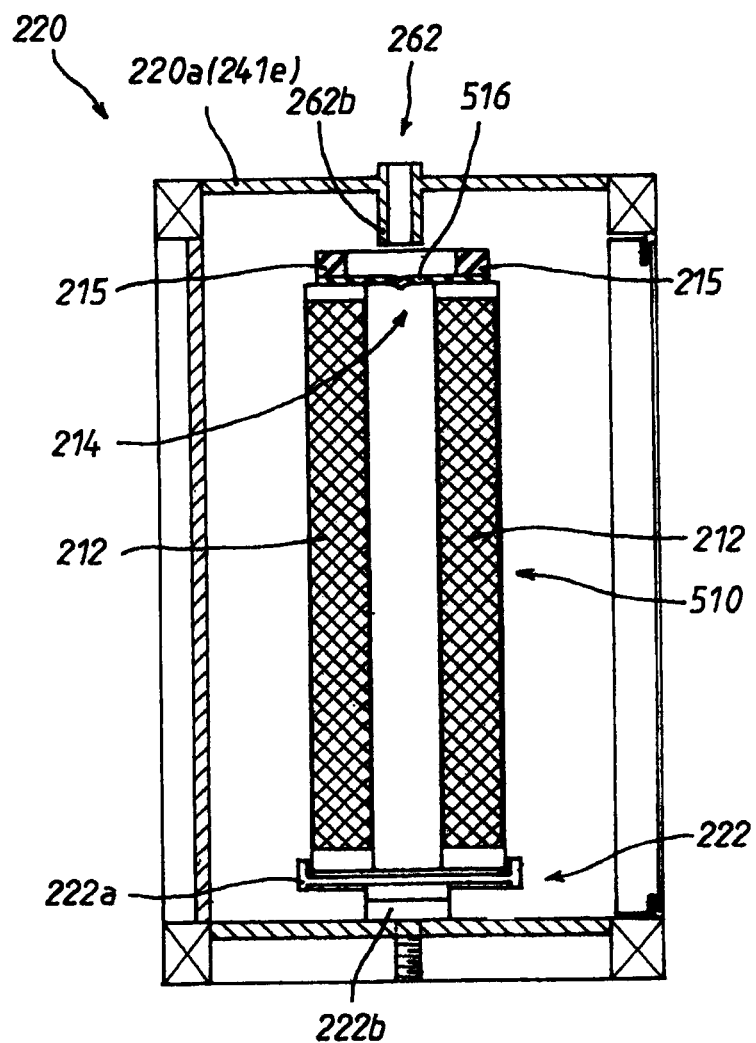
FIG. 18 is a sectional view illustrating a state before the filter unit for air purification illustrated in FIG. 17 is attached to the housing when seen from the side face.

Subsequently, a state in which the filter unit 510 configured as above is attached in the housing unit 220 will be described. FIG. 18 is a sectional view of the housing 220 before the filter unit 510 is attached when seen from the side face.

The housing 220 has, as illustrated in FIG. 18, an opening width of the air outlet 262 opened in the upper wall portion 220a of the housing 220 smaller than that of the above-described embodiment 2A and also the extending length of the lower extending portion 262b provided on the peripheral edge portion of the air outlet 262 longer than that of the above-described embodiment 2A.

As a result, when the filter unit 510 is attached to the air outlet 262, the lower extending portion 262b pushes and bends the rubber sheet 516 and is inserted into the air inlet portion 214 of the filter unit 510. This state will be described below.

In FIG. 18, the filter unit 510 has its lower end portion received by the receiving member 222a of the unit pressing tool 222 and is arranged below the air outlet 262. At this time, the receiving member 222a is in a state lowered by the movable member 222b, and the air inlet portion 214 of the filter unit 510 is not attached to the air outlet 262.

Figure 19:
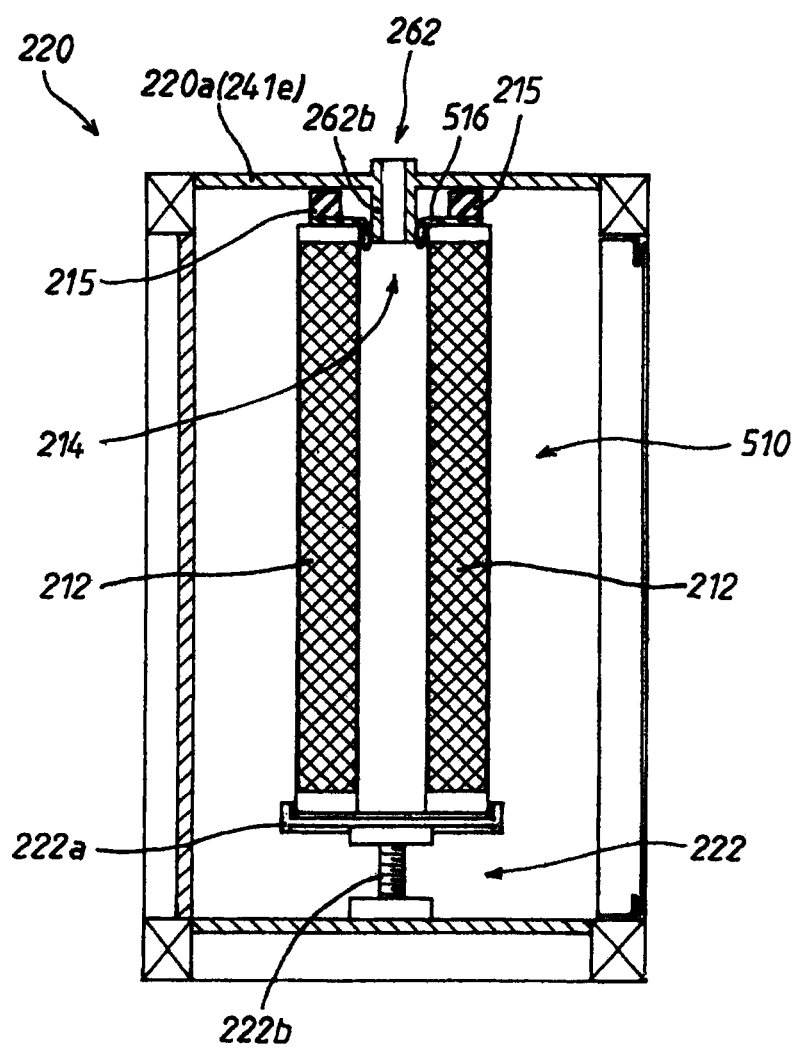
FIG. 19 is a sectional view illustrating a state when the filter unit for air purification illustrated in FIG. 17 is attached to the housing when seen from the side face.

Subsequently, as illustrated in FIG. 19, if the screw of the movable member 222b of the unit pressing tool 222 is rotated so as to push up the receiving member 222a, the lower extending portion 262b of the air outlet 262 pushes down and bends the rubber sheet 516 and is inserted into the air inlet portion 214 of the filter unit 510. At this time, the rubber sheet 516 is interposed between the inner peripheral portion of the air inlet portion 214 and the outer peripheral portion of the lower extending portion 262b and works as a sealing material.

In this state, the filter unit 510 is attached so that the packing 215 is brought into contact with the wall portion 220a of the upper face of the housing 220 so as to have the air inlet portion 214 opposed to the air outlet 262. At this time, the lower end portion of the filter unit 510 is received by the receiving member 222a and is pressed upward by the movable member 222b, and the filter unit 510 is attached to the air outlet 262 by the packing 215 through the air inlet portion 214 in the sealing manner.

The filter unit 510 used in the state as above has a large quantity of the chemicals and the like adhering to the space inside and the air intake surface 212c of the HEPA filter 212. Thus, if this used filter unit 510 is to be removed from the housing 220, the wet-down is performed as described above.

In the filter unit 510, unlike the above-described embodiment 2A, the lid body 216 is not attached to the air inlet portion 214, the opening/closing door 221 of the housing 220 is opened, the screw of the movable member 222b pressing the filter unit 510 upward is loosened, the receiving member 222a is lowered downward, and the filter unit 510 is removed from the air outlet 262.

At this time, the rubber sheet 516 having been pushed downward and bent by the lower extending portion 262b recovers to a position for closing the air inlet portion 214. As a result, the inside of the filter unit 510 contaminated by the chemical substances and the like is sealed, and the chemical substances and the like inside do not leak to the outside environment.

The filter unit according to this embodiment 2D configured as above is different from the filter units according to the above-described embodiments 2A to 2C in which the inside of the filter unit is sealed by providing a detachable lid body in a point that the filter unit is provided with a flexible rubber sheet at the air inlet in a fixed manner. This flexible rubber sheet is formed of four rubber sheets and in a state for closing the air inlet portion in usual, but by pressing and bending these rubber sheets, the air inlet portion can be opened.

Therefore, when the air is to be purified by attaching the filter unit to the housing, these flexible rubber sheets are pushed and bent so as to open the air inlet portion. On the other hand, if the used filter unit is to be replaced from the housing, these flexible rubber sheets recover and close the air inlet portion. As a result, leakage of the chemical substances and the like trapped inside the filter unit to the outside environment can be suppressed.

(Embodiment 2E of Filter Unit for Air Purification)

Figure 20:
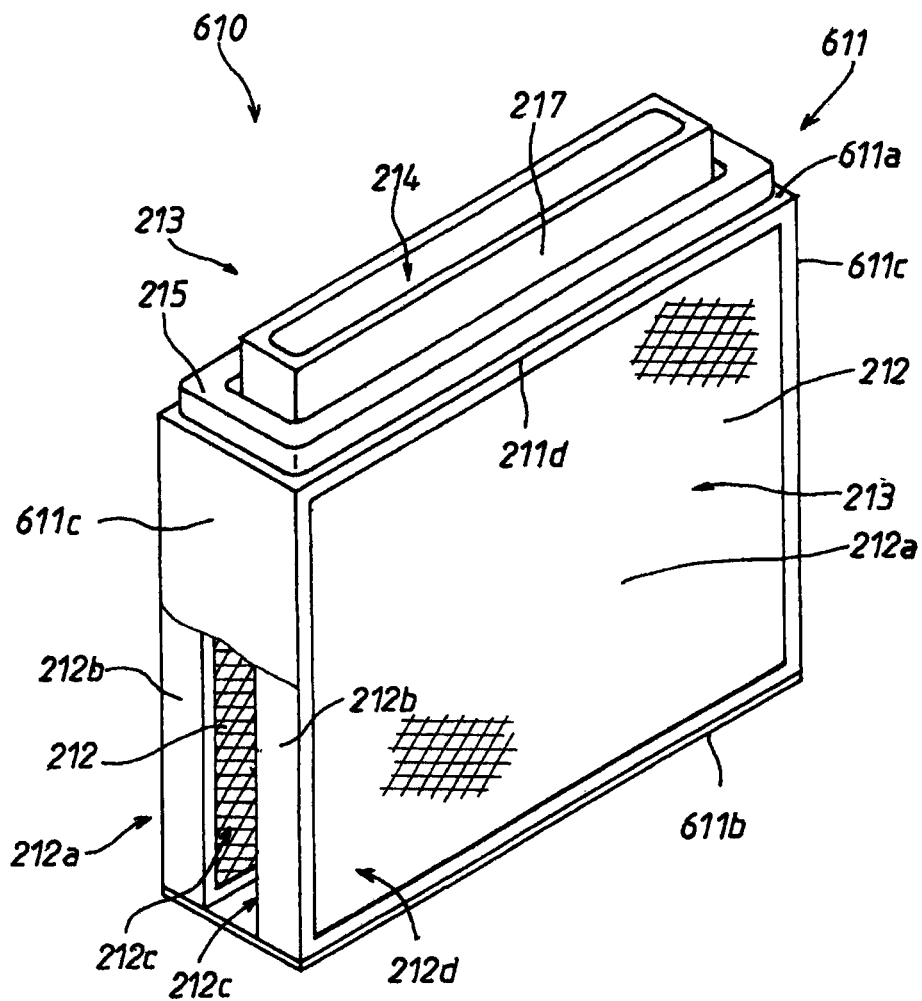
FIG. 20 is a perspective view illustrating another embodiment 2E of the filter unit for air purification incorporated in the isolator device illustrated in FIG. 9.

Subsequently, an embodiment 2E of the filter unit according to the present invention will be described. A filter unit 610 has a configuration similar to that of the filter unit 210 according to the above-described embodiment 2A. However, on the peripheral edge portion of the air inlet portion 214 opened in a top plate 611a of the filter unit 610, an annular mounting port portion 217 made of a stainless metal plate and extending upward over the entire periphery of the peripheral edge portion is provided (See FIG. 20).

Figure 21:
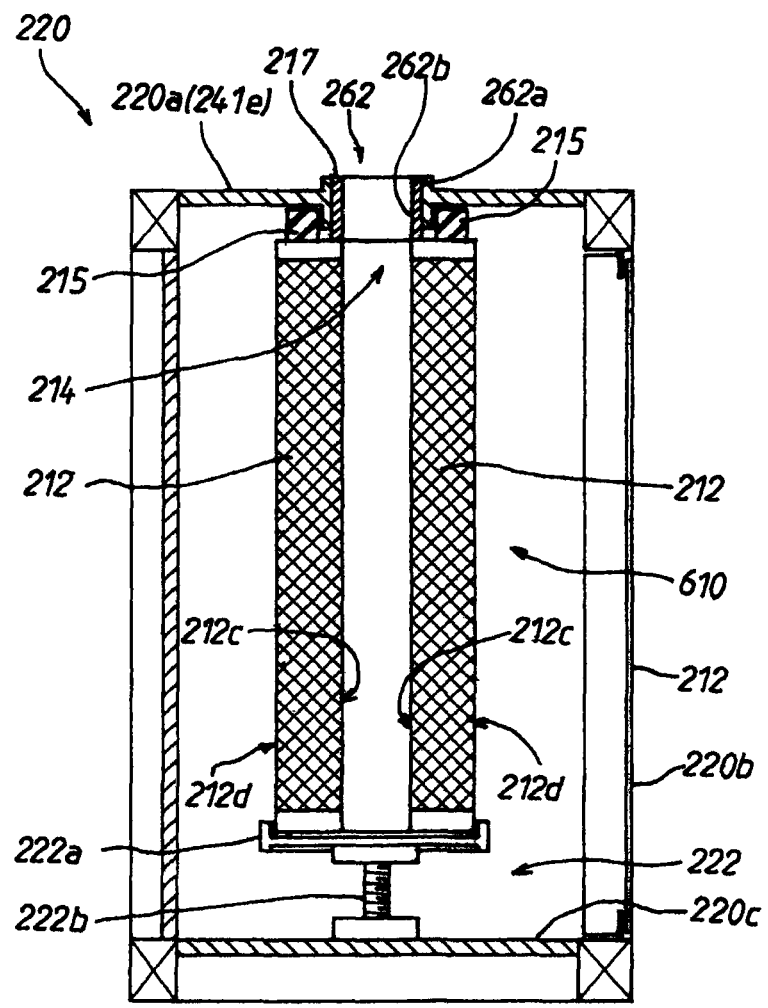
FIG. 21 is a sectional view illustrating a state where the filter unit for air purification illustrated in FIG. 20 is attached to the housing when seen from the side face.
Figure 22:
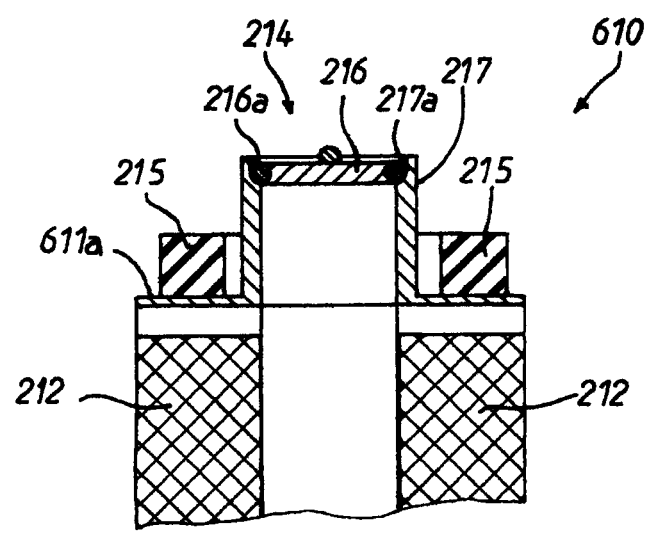
FIG. 22 is a partial sectional view illustrating a state where a lid body is attached to the filter unit for air purification illustrated in FIG. 21.

Subsequently, a state where the filter unit 610 configured as above is attached in the housing 220 will be described. FIG. 21 is a sectional view of the housing 220 in which the filter unit 610 is attached when seen from the side face.

In the housing 220 having the configuration similar to that of the above-described embodiment 2A, the filter unit 610 has the air inlet portion 214 opposed to the air outlet 262 and inserts the mounting port portion 217 into the air outlet 262 along the inner peripheral portion of the lower extending portion 262b and also has the packing 215 brought into contact with the upper wall portion 220a of the housing 220 along the outer peripheral portion of the lower extending portion 262b. At this time, the lower end portion of the filter unit 610 is received by the receiving member 222a and is pressed upward by the movable member 222b, and the filter unit 610 is attached to the air outlet 262 by the packing 215 through the air inlet portion 214 in the sealing manner.

Moreover, when the filter 610 is to be replaced, the lid body 216 similar to the above-described embodiment 2A is attached to the mounting groove 217a provided in the mounting port portion 217 by the packing 216a in the sealing manner. As a result, the inside of the filter unit 610 contaminated by the chemical substances and the like is sealed, and the chemical substances and the like inside do not leak to the outside environment.

The filter unit according to this embodiment 2E configured as above is different from the filter units according to the above-described embodiments 2A to 2D in which this mounting port portion is not provided in a point that the annular mounting port portion made of a stainless metal plate is provided in the air inlet portion.

Therefore, when the filter unit is to be attached to the housing, this mounting port portion can be inserted into the air outlet along the inner peripheral portion of the lower extending portion, and the attachment of the filter unit to the housing is made stable. Moreover, since an extending end portion of the mounting port portion to which the lid body is attached is extended to the lower extending portion, the attachment of the lid body is facilitated. As a result, the replacement work of the filter unit can be performed more easily.

As described above, in the second embodiment, the isolator device provided with the filter unit for air purification in which, in response to the risk after the operation of the isolator device is finished, the filter replacement work is simple and the risk of contaminating the outside environment by the replacement work is low, the structure is simple, the maintenance cost of the isolator device including the manufacturing cost and the disposal cost is inexpensive, and moreover, the check of completeness by the scan test can be conducted and thus, safety can be confirmed easily can be provided.

In working of the present invention, not limited to each of the above-described embodiment, the following various variations can be cited:

(1) In each of the above-described embodiments, two bulkheads are provided on the front face and the rear face of the chamber, but the number of bulkheads to be provided in the chamber is not limited to that but may be provided only on one face or on three or four faces.

(2) In the above-described first embodiment, the hollow rectangular pipe is used for the frame material constituting the frame body of the rectifying plate, but this is not limiting, but a rectangular metal rod or the like may be used instead of the rectangular pipe. Alternatively, the sectional shape does not have to be a rectangle.

(3) In the above-described first embodiment, the shape of the through port opened in the rectangular pipe constituting the frame body of the rectifying plate is an oval, but this is not limiting and may be any shape such as circular or rectangular.

(4) In the above-described first embodiment, the through port is formed in the rectangular pipe constituting the frame body of the rectifying plate, but this is not limiting, and a rectangular pipe having an upper face and a bottom face formed of a whole punching plate may be used.

(5) In the above-described first embodiment, as the porous sheet of the rectifying plate, the membrane screen having the same line diameter and the same aperture is used for the upper face and the bottom face, but this is not limiting, and the line diameter or the aperture of the membrane screen used for the upper face and the bottom face may be different. In this case, by setting the aperture of the membrane screen on the bottom face side (to be attached to the frame material) coarser, the difference in the air passage resistance between the single-layer portion and the double-layer portion can be made larger. Alternatively, a porous ceramic plate having communication holes may be used instead of the membrane screen.

(6) In the above-described first embodiment, a combination of the single layer portion and the double layer portion of the membrane screen is employed for the rectifying plate, but this is not limiting, and any combination such as a combination of a double layer portion and a triple layer portion or a combination of a single layer portion and a triple layer portion may be employed.

(7) In each of the above-described embodiments, the HEPA filter is used for the air feeding and air discharging filters, but the filter is not limited to the HEPA filter but an ULPA filter or other high performance filter may be selected as appropriate in accordance with the use purpose of the work in the chamber.

(8) In the above-described second embodiment, the bag-in/bag-out method is not used for the replacement work of the filter unit. But this is not limiting, and use of a simplified bag-in/bag-out method is effective. For example, by attaching a bag below the receiving member when the filter unit is attached in advance, seeping out of the washing water from the air discharge surface during wet-down can be trapped. Moreover, by accommodating the filter unit in the bag when the filter unit is removed, safety is further improved.

(9) In the above-described second embodiment, the filter unit is replaced in the state where the air feeding blower and the air discharge blower are stopped. But this is not limiting, and the replacement work may be performed while the air discharge blower is being operated. In this case, even if the chemical substances and the like fly apart due to some reason during the replacement work, leakage of the chemical substances and the like from inside the housing to the outside environment by suctioning by the air discharge blower can be prevented. In this case, it is effective to attach another filter on the downstream side of the housing.

REFERENCE SIGNS LIST

A isolator device
B rack
C isolator main body
D worker
10, 240 chamber
11a, 11b bulkhead 243 glass bulkhead
12, 245 internal space
12a, 245a central space
12b, 245b peripheral space
13, 14, 242 glass window
15, 248 glove
18a to 18d, 262 air outlet
20, 250 air feed mechanism
21, 251 air feeding blower
252 air feeding filter
254 air inlet
22 air feeding filter unit
22b, 31a, 32a, 212 HEPA filter
23, 253 rectifying plate
24 frame body
24a frame material
24b, 26b through port
25a, 25b membrane screen
26 receiving member
30, 260 air discharge mechanism
31 air-discharge primary filter unit
32 air-discharge secondary filter unit
33 air discharge blower
210 filter unit for air purification
211 cylindrical body
212a filter
212b outer frame
212c air intake surface
212d air discharge surface
213 air discharge port portion
214 air inlet portion
215 packing
216 lid body
217 mounting port portion
220 housing
221 opening/closing door
222 unit pressing tool
222a receiving member
222b movable member
230 electric component and machine room
246 opening portion for work
247 auxiliary opening portion
249 duct
415 liquid seal
516 rubber sheet.

The invention claimed is:

1. An isolator device comprising:
a work chamber;
air supply means for supplying air of a unidirectional airflow traveling from an upper part to a lower part in said work chamber; and
air discharge means for discharging said unidirectional airflow from a lower part of said work chamber, further including:
a bulkhead provided in parallel with a peripheral wall portion of said work chamber along said air of unidirectional airflow;
a longitudinal air outlet opened along a width direction below a of a lower end portion in a lower part of the lower end portion of said bulkhead;
said air supply means has a rectifying member forming air in said unidirectional airflow;
said rectifying member is provided with a frame body formed of a plurality of frame materials and two porous sheets fixed to said frame material so as to cover an upper face and a bottom face of this frame body;
said frame material is provided with a plurality of through ports penetrating from the upper face to the bottom face thereof; and
said two porous sheets covers only either one of opening portions, that is, an opening portion of said through port and also an upper face opening portion or a bottom face opening portion of said frame material in a portion brought into contact with said frame material and fixed to the frame material.

2. The isolator device according to claim 1, further comprising:
another bulkhead provided in parallel with another peripheral wall portion opposite to said peripheral wall portion; and
longitudinal other air outlets opened in the width direction of the lower end portion in the lower part of the lower end portion of said another bulkhead.

3. The isolator device according to claim 1, wherein
said air outlet is formed in a bottom wall portion of said work chamber and opened immediately below said lower end portion or closer to the center of said work chamber than the spot immediately below.

4. The isolator device according to claim 1, wherein
said air outlet is composed of one or two or more opening portions for said bulkheads, respectively; and
the total of the longitudinal opening lengths of said one or two or more opening portions is at a rate of 50 to 100% to the length in the width direction of said lower end portion.

5. The isolator device according to claim 1, wherein
said porous sheet is membrane screen having a large number of fine pores through which the front and the back communicate with each other.

6. The isolator device according to claim 1, wherein
in the air flowing while passing through the rectifying member when a predetermined amount of air is supplied to said rectifying member,
said through port is opened in said frame material, assuming that a flow velocity of the air passing through a portion in said upper face opening portion or said bottom face opening portion covered by said porous sheet where the porous sheet has a single layer is V1; and
a flow velocity of the air passing through a portion where said porous sheet is not brought into contact with said frame material and the porous sheet has double layers is V2;
an opening rate X(%) of said opening portion covered by said porous sheet to an area of the upper face or the bottom face of said frame material satisfies the following expression:

$$X=(V2/V1)\times 100.$$

7. The isolator device according to claim 1, wherein
said air discharge means is provided with a filter unit for air purification detachably attached to a channel of air in said unidirectional airflow discharged from said longitudinal air outlet;
said filter unit for air purification includes:
a rectangular cylindrical body having a first wall portion provided with a longitudinal air inlet portion through which the air is introduced and a second wall portion formed so as to cross said first wall portion and provided with an air discharge port portion through which the air introduced from said air inlet portion is discharged; and a filter member provided in the air discharge port portion so as to constitute an outer wall surface of said air discharge port portion and filtering said air introduced as above; and the filter unit for air purification is attached to the outside of said work chamber so as to oppose said air inlet portion to said air outlet.

8. The isolator device according to claim 7, wherein said filter unit for air purification is provided with another filter member;

said cylindrical body has a third wall portion formed so as to oppose said second wall portion and provided with another air discharge port portion for discharging said introduced air; and said another filter member is provided in said another air discharge port portion so as to constitute the outer wall surface of said another air discharge port portion on the air discharge surface thereof and discharges said filtered air.

9. The isolator device according to claim 7, wherein said filter unit for air purification is provided with:
a detachable lid body closing said air inlet portion; and
a packing interposed in an airtight manner between an outer peripheral edge portion of this lid body and an inner peripheral edge portion of said air inlet portion.

10. The isolator device according to claim 7, wherein said filter unit for air purification has
an opening/closing member provided with a plurality of flexible sheets extended inward from the outer peripheral edge portion of said air inlet portion and closing the air inlet portion capable of opening/closing the same.

11. The isolator device according to claim 5, wherein in the air flowing while passing through the rectifying member when a predetermined amount of air is supplied to said rectifying member, said through port is opened in said frame material, assuming that a flow velocity of the air passing through a portion in said upper face opening portion or said bottom face opening portion covered by said porous sheet where the porous sheet has a single layer is V1; and a flow velocity of the air passing through a portion where said porous sheet is not brought into contact with said frame material and the porous sheet has double layers is V2;

an opening rate X(%) of said opening portion covered by said porous sheet to an area of the upper face or the bottom face of said frame material satisfies the following expression:

$X = (V2/V1) \times 100$.

12. The isolator device according to claim 8, wherein said filter unit for air purification is provided with:
a detachable lid body closing said air inlet portion; and
a packing interposed in an airtight manner between an outer peripheral edge portion of this lid body and an inner peripheral edge portion of said air inlet portion.

13. The isolator device according to claim 8, wherein said filter unit for air purification has
an opening/closing member provided with a plurality of flexible sheets extended inward from the outer peripheral edge portion of said air inlet portion and closing the air inlet portion capable of opening/closing the same.

14. The isolator device according to claim 2, wherein said porous sheet is screen gauze having a large number of fine pores through which the front and the back communicate with each other.

15. The isolator device according to claim 2, wherein in the air flowing while passing through the rectifying member when a predetermined amount of air is supplied to said rectifying member, said through port is opened in said frame material, assuming that a flow velocity of the air passing through a portion in said upper face opening portion or said bottom face opening portion covered by said porous sheet where the porous sheet has a single layer is V1; and a flow velocity of the air passing through a portion where said porous sheet is not brought into contact with said frame material and the porous sheet has double layers is V2;

an opening rate X(%) of said opening portion covered by said porous sheet to an area of the upper face or the bottom face of said frame material satisfies the following expression:

$X = (V2/V1) \times 100$.

16. The isolator device according to claim 14, wherein in the air flowing while passing through the rectifying member when a predetermined amount of air is supplied to said rectifying member, said through port is opened in said frame material, assuming that a flow velocity of the air passing through a portion in said upper face opening portion or said bottom face opening portion covered by said porous sheet where the porous sheet has a single layer is V1; and a flow velocity of the air passing through a portion where said porous sheet is not brought into contact with said frame material and the porous sheet has double layers is V2;

an opening rate X(%) of said opening portion covered by said porous sheet to an area of the upper face or the bottom face of said frame material satisfies the following expression:

$X = (V2/V1) \times 100$.

17. The isolator device according to claim 2, wherein said said air outlet is formed in a bottom wall portion of said work chamber and opened immediately below said lower end portion or closer to the center of said work chamber than the spot immediately below.

18. The isolator device according to claim 2, wherein said air outlet is composed of one or more opening portions for said bulkheads, respectively; and
the total of the longitudinal opening lengths of said one or two or more opening portions is at a rate of 50 to 100% to the length in the width direction of said lower end portion.

* * * * *